(12) United States Patent
Niessner et al.

(10) Patent No.: US 10,508,180 B2
(45) Date of Patent: Dec. 17, 2019

(54) METHOD FOR PRODUCING FIBRE COMPOSITES FROM AMORPHOUS, CHEMICALLY MODIFIED POLYMERS

(71) Applicant: INEOS STYROLUTION GROUP GMBH, Frankfurt am Main (DE)

(72) Inventors: Norbert Niessner, Friedelsheim (DE); Eike Jahnke, Aubonne (CH)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 0 days.

(21) Appl. No.: 15/567,430

(22) PCT Filed: Apr. 22, 2016

(86) PCT No.: PCT/EP2016/059065
§ 371 (c)(1),
(2) Date: Oct. 18, 2017

(87) PCT Pub. No.: WO2016/170145
PCT Pub. Date: Oct. 27, 2016

(65) Prior Publication Data
US 2018/0105656 A1    Apr. 19, 2018

(30) Foreign Application Priority Data

Apr. 22, 2015   (DE) .......................... 10 2015 207 365

(51) Int. Cl.
*C08J 5/04* (2006.01)
*C08J 5/08* (2006.01)
(Continued)

(52) U.S. Cl.
CPC .............. *C08J 5/043* (2013.01); *B29C 70/08* (2013.01); *B32B 5/02* (2013.01); *B32B 5/022* (2013.01);
(Continued)

(58) Field of Classification Search
CPC ........ B32B 2260/021; B32B 2260/023; B32B 2260/046; B32B 2262/101;
(Continued)

(56) References Cited

U.S. PATENT DOCUMENTS

| 5,008,145 A | 4/1991 | Kinson et al. |
| 2011/0020572 A1 | 1/2011 | Malek et al. |
| 2012/0059109 A1 | 3/2012 | Weber et al. |

FOREIGN PATENT DOCUMENTS

| CN | 101555341 A | 10/2009 |
| CN | 102924857 A | 2/2013 |

(Continued)

*Primary Examiner* — Camie S Thompson
(74) *Attorney, Agent, or Firm* — J.A. Lindeman & Co, PLLC; Jeffrey Lindeman; Aaron Raphael

(57) ABSTRACT

The invention relates to a method for producing thermoplastic fibre composites made from a thermoplastic matrix (M) comprising a thermoplastic moulding compound (A) and reinforcing fibres (B). Said method has technical advantages when it comprises the following steps: i) a flat structure (F) made of reinforcing fibres (B) is provided, ii) the flat structure (F) is introduced into a matrix M, iii) functional groups of the matrix are reacted with polar groups of the reinforcing fibres (B), iv) the fibre composite materials is consolidated.

19 Claims, 6 Drawing Sheets

Figure 1A:
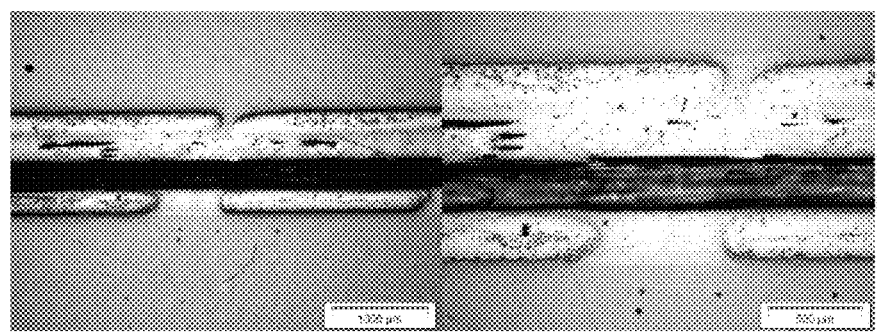

(51) Int. Cl.
*B32B 27/12* (2006.01)
*B29C 70/08* (2006.01)
*B32B 5/02* (2006.01)
*B32B 5/24* (2006.01)
*B32B 5/26* (2006.01)

(52) U.S. Cl.
CPC ............... *B32B 5/024* (2013.01); *B32B 5/24* (2013.01); *B32B 5/26* (2013.01); *B32B 27/12* (2013.01); *C08J 5/08* (2013.01); *B32B 2260/021* (2013.01); *B32B 2260/023* (2013.01); *B32B 2260/046* (2013.01); *B32B 2262/101* (2013.01); *B32B 2307/412* (2013.01); *B32B 2307/558* (2013.01); *B32B 2307/702* (2013.01); *C08J 2325/08* (2013.01); *C08J 2325/10* (2013.01); *C08J 2325/12* (2013.01)

(58) Field of Classification Search
CPC ..... B32B 2307/558; B32B 27/12; B32B 5/02; B32B 5/022; B32B 5/024; B32B 5/24; B32B 5/26; B32B 2307/702; C08J 2325/08; C08J 2325/12; C08J 2325/10; C08J 5/043; C08J 5/08; B29C 70/08; B29C 70/06; B29C 70/52; D01F 8/06; D04H 1/541; D04H 1/544; D06M 13/148; D06M 13/332
USPC ...................................... 428/299.4
See application file for complete search history.

(56) References Cited

FOREIGN PATENT DOCUMENTS

| | | | |
|---|---|---|---|
| DE | 2160778 | A1 | 6/1973 |
| EP | 1923420 | A1 | 5/2008 |
| EP | 2251377 | A1 | 11/2010 |
| JP | H06-31821 | * | 2/1994 |
| KR | 20020054717 | A | 7/2002 |
| WO | 2008/058971 | A1 | 5/2008 |
| WO | 2008/110539 | A1 | 9/2008 |
| WO | WO2008110539 | * | 9/2008 |
| WO | 2008/119678 | A1 | 10/2008 |
| WO | 2011/023541 | A1 | 3/2011 |
| WO | WO2011/023541 | * | 3/2011 |

* cited by examiner

METHOD FOR PRODUCING FIBRE COMPOSITES FROM AMORPHOUS, CHEMICALLY MODIFIED POLYMERS

The present invention relates to a process for producing fiber composite materials (also called organosheets) comprising a thermoplastic molding compound A and at least one ply of reinforcing fibers B, wherein the at least one sheetlike structure F composed of reinforcing fibers B is embedded into the matrix with the thermoplastic molding compound A and wherein the thermoplastic molding compound A has at least one chemically reactive functionality. The invention also relates to sheetlike structures composed of reinforcing fibers.

Fiber composite materials or organosheets usually consist of a multitude of reinforcing fibers embedded into a polymer matrix. The fields of use of fiber composite materials are manifold. For example, fiber composite materials are used in the automotive and aerospace sector. In this case, fiber composite materials are intended to prevent the breakup or other fragmentations of the matrix, in order thus to reduce the risk of accident resulting from distributed component shreds. Many fiber composite materials are capable of absorbing comparatively high forces under stress before failing totally. At the same time, fiber composite materials feature high strength and stiffness coupled with low density compared to conventional unreinforced materials, and further advantageous properties, for example good aging and corrosion resistance.

The strength and stiffness of the fiber composite materials are adaptable here with respect to the direction of stress and type of stress. It is the fibers here that are primarily responsible for the strength and stiffness of the fiber composite material. Moreover, the arrangement thereof also determines the mechanical properties of the respective fiber composite material. The matrix, by contrast, serves primarily for introduction of the forces to be absorbed into the individual fibers and for retention of the three-dimensional arrangement of the fibers in the desired orientation. Since both the fibers and the matrix materials are variable, there are numerous possible combinations of fibers and matrix materials.

In the production of fiber composite materials, the bonding of fibers and matrix to one another plays an essential role. The strength of the embedding of the fibers into the polymer matrix (fiber-matrix adhesion) can also have a considerable influence on the properties of the fiber composite material.

For optimization of the fiber-matrix adhesion and in order to compensate for "low chemical similarity" between the fiber surfaces and the surrounding polymer matrix, reinforcing fibers are regularly pretreated. For this purpose, adhesion promoters are regularly added to what is called the size. A size (sizing agent) of this kind is regularly applied to the fiber during the production in order to improve the further processibility of the fibers (such as weaving, laying, sewing). If the size is unwanted for the later further processing, it first has to be removed in an additional process step, for instance by burning it down. In some cases, glass fibers are also used in unsized form.

Then, for the production of the fiber composite material, a further adhesion promoter is applied in an additional process step. Size and/or adhesion promoter form a layer on the surface of the fibers, which can essentially determine the interaction of the fibers with the environment. Nowadays there is a multitude of different adhesion promoters available. The person skilled in the art can choose a suitable adhesion promoter compatible with the matrix and with the fiber according to the field of use, the matrix to be used and the fibers to be used.

One technical challenge is that, in the event of occurrence of total failure, the fiber composite material can undergo brittle fracture. Consequently, for example, there can be a considerable risk of accident from torn components in the construction of elements exposed to a high level of stress.

It is therefore desirable to provide fiber composite materials with a wide range of stress under which total failure is improbable. What are desirable at the same time are additionally good optical properties, such as the option of being able to produce various elements with smooth surfaces by means of the fiber composite materials.

WO 2008/058971 described molding compounds that use groups of reinforcing fibers. Each of the groups of reinforcing fibers is provided with different adhesion promoter components that bring about the different fiber-matrix adhesions. The second fiber-matrix adhesion is lower than the first fiber-matrix adhesion, and the near-surface plies of reinforcing fibers composed of reinforcing fibers from the first group are formed with greater fiber-matrix adhesion. Matrix materials proposed are thermosets such as polyesters and the thermoplastics polyamide and polypropylene.

WO 2008/119678 describes a glass fiber-reinforced styrene acrylonitrile copolymer (SAN), the mechanical properties of which are improved through use of maleic anhydride group-containing styrene copolymer and chopped glass fibers. The use of short fibers is therefore taught. However, no pointer is given to fiber composite materials.

CN 102924857 describes mixtures of styrene-maleic anhydride copolymers which are mixed with chopped glass and then have relatively high strengths. However, the stress cracking resistance of such a material with respect to solvents is too low. The strength with respect to glass fiber composites is also much too low.

CN 101555341 describes mixtures of acrylonitrile-butadiene-styrene (ABS), glass fibers, maleic anhydride-containing polymers and epoxy resins. In the production, ABS and the maleic anhydride-containing polymer are initially charged, in order first to add the epoxy resin and then the glass fibers. The flowability of such a mixture comprising a (thermoset) epoxy resin is very limited.

KR 100376049 teaches mixtures of SAN, maleic anhydride- and N-phenylmaleimide-containing copolymer, chopped glass fibers and an aminosilane-based coupling agent. The use of such a coupling agent leads to additional processing steps and hence increases the production costs.

US 2011/0020572 describes organosheet components having a hybrid design composed, for example, of a highly free-flowing polycarbonate component. This involves rendering polycarbonate (PC) free-flowing by means of suitable additives, such as by means of hyperbranched polyesters, ethylene/(meth)acrylate copolymers or low molecular weight polyalkylene glycol esters.

EP-A 2 251 377 describes organosheets comprising individual fibers and fiber rovings.

(Glass) fibers in the prior art are frequently treated with a size which protects the fibers from one another in particular. Mutual damage via abrasion is to be avoided. Mutual mechanical contact is not supposed to result in cross-fragmentation (fracturing). Moreover, by means of the size, the operation of cutting the fibers can be facilitated, in order to obtain an equal stack length in particular. In addition, the size can prevent agglomeration of the fibers.

The dispersibility of short fibers in water can be improved. It is thus possible to obtain homogeneous sheetlike structures by the wet laying method.

A size can contribute to establishment of improved cohesion between the glass fibers and the polymer matrix in which the glass fibers act as reinforcing fibers. This principle is employed particularly in the case of the glass fiber-reinforced plastics (GFRP).

To date, the glass fiber sizes have generally comprised a large number of constituents, for example film formers, lubricants, wetting agents and adhesion promoters.

A film former protects the glass filaments from mutual friction and can additionally enhance affinity for synthetic resins, in order thus to promote the strength and cohesion of a composite material. Mention should be made of starch derivatives, polymers and copolymer of vinyl acetate and acrylic esters, epoxy resin emulsions, polyurethane resins and polyamides with a proportion of 0.5% to 12% by weight, based on the overall size.

A lubricant imparts suppleness to the glass fibers and their products, and reduces the mutual friction of the glass fibers, including the production. Often, however, the adhesion between glass and synthetic resin is impaired by the use of lubricants. Mention should be made of fats, oils and polyalkyleneamines in an amount of 0.01% to 1% by weight, based on the overall size.

A wetting agent brings about lowering of the surface tension and improved wetting of the filaments with the size. For aqueous sizes, mention should be made, for example, of polyfatty acid amides in an amount of 0.1% to 1.5% by weight, based on the overall size.

There is often no suitable affinity between the polymer matrix and the glass fibers. This gap can be bridged by adhesion promoters which increase the adhesion of polymers on the fiber surface. Mention should be made of most organofunctional silanes, for example aminopropyltriethoxysilane, methacryloyloxypropyltrimethoxy-silane, glycidyloxypropyltrimethoxysilane and the like.

Silanes which are added to an aqueous size are usually hydrolyzed to silanols. These silanols can then react with reactive (glass) fiber surfaces and hence form an adhesion promoter layer (with a thickness of about 3 nm).

Consequently, functional agents of low molecular weight having silanol groups can react at the glass surface, in which case these agents of low molecular weight then react further (for example in epoxy resins) and in so doing assure chemical binding of the glass fiber to the polymer matrix. However, such production is time-consuming and takes between about 30 minutes and more than one hour for complete curing of the polymers (for example the abovementioned epoxy resins).

It therefore seems desirable, in an improved process, to combine already polymerized melts with glass fibers or other reinforcing fibers.

Functionalization by reaction with polymers is likewise known. For instance, it is possible, through use of polycarbonate types of low molecular weight, to efficiently impregnate the glass fiber weave or scrim and to conduct "grafting" by reaction of functional groups on the glass fiber surface with the polycarbonate, which increases compatibility with the polymer. However, this procedure has the disadvantage that polycarbonate (PC) has a very high viscosity and it is necessary for this impregnation step to use PC of low molecular weight, i.e. low viscosity, which is of extremely poor suitability for use, for example has low resistance to agents that trigger stress cracking, such as polar solvents.

One technical object of the invention is that of providing a process for producing a fiber composite material (organosheet) having suitable properties for production of molded bodies, films and coatings. The fiber composite material should be based on a solid composite material which is easy to process, is substantially inert with respect to conventional solvents, has good stress cracking resistance and has a smooth surface. Ideally, the fiber composite material does not need any adhesion promoter. The invention likewise provides a fiber composite material which has been or is obtained from the process of the invention.

It has been found that, surprisingly, a fiber composite material comprising at least one thermoplastic molding compound A as matrix, at least one ply of reinforcing fibers B, and optionally at least one additive C, where the at least one ply of reinforcing fibers B has been embedded into the matrix, and where the thermoplastic molding compound A has at least one chemically reactive functionality that reacts with chemical groups on the surface of component B during the process for production of the fiber composite material gives a fiber composite material having good strength and is resistant to stress cracking and to solvents.

One aspect of the present invention thus relates to a process for producing a thermoplastic fiber composite material from a thermoplastic matrix M comprising at least one thermoplastic molding compound A and reinforcing fibers B, comprising the steps of:
i) providing at least one sheetlike structure F composed of reinforcing fibers B,
ii) introducing the at least one sheetlike structure F into a thermoplastic matrix M,
iii) reacting functional groups in the thermoplastic matrix M with polar groups on the surface of the reinforcing fibers B,
iv) consolidating the fiber composite material,
v) optionally cooling (and optionally further process steps).

The person skilled in the art will appreciate that the thermoplastic molding compound A, in accordance with the invention, comprises at least one (co)polymer having at least one chemically reactive functionality that reacts with chemical groups on the surface of the reinforcing fiber component B during the process for producing the fiber composite material. Such a (co)polymer comprises at least one functional monomer A-I, the functionality of which reacts with chemical groups on the surface of the reinforcing component B during the process for producing the fiber composite material. The (co)polymer comprising monomer A-I is also referred to herein as polymer component (A-a).

Optionally, the thermoplastic molding compound A may also comprise one or more (co)polymers that are optionally also free of any such chemically reactive functionality (and therefore do not contain any functional monomer A-I) and hence do not react with chemical groups at the surface of the reinforcing fiber component B during the process for producing the fiber composite material. Such a (co)polymer is also referred to herein as polymer component (A-b).

The invention particularly relates to a process as described above, wherein the fiber composite material comprises:
a) at least one thermoplastic molding compound as matrix M,
b) at least one sheetlike structure F composed of reinforcing fibers B, and
c) optionally at least one additive C,
in which multiple sheetlike structures F composed of reinforcing fibers B have been embedded into the matrix M and the thermoplastic molding compound A has at least one chemically reactive functionality.

In a further embodiment, the invention particularly relates to a process as described above, wherein the fiber composite material consists of
a) 30% to 95% by weight of the thermoplastic matrix M,
b) 5% to 70% by weight of the reinforcing fibers B, and
c) 0 to 40% by weight of the additive C.

In a further embodiment, the invention particularly relates to a process as described above, wherein the thermoplastic molding compound A used as matrix is amorphous.

The process can be used for production of a (partly) translucent and/or printable fiber composite material W.

In a further embodiment, the invention particularly relates to a process as described above, wherein the thermoplastic molding compound A is selected from the group consisting of polystyrene (glass-clear or impact-resistant), styrene-acrylonitrile copolymers, alpha-methylstyrene-acrylonitrile copolymers, impact-modified acrylonitrile-styrene copolymers, especially acrylonitrile-butadiene-styrene copolymers, styrene-methyl methacrylate copolymers and acrylonitrile-styrene-acrylic ester copolymers, and blends of the copolymers mentioned with polycarbonate or polyamide.

It will be appreciated that, in accordance with the invention, at least one of the (co)polymer components of the thermoplastic molding compound A is a (co)polymer having at least one chemically reactive functionality as described herein (polymer component (A-a)). Each of the copolymer components mentioned in the preceding paragraph may accordingly also have, in addition to the monomers mentioned explicitly, a reactive functionality which can react with the surface of the fibers B during the production of the fiber composite material. It is thus possible for each of the aforementioned (co)polymers also to be a polymer component (A-a).

Accordingly, the aforementioned polymer components, in their use as polymer component (A-a), will generally also comprise at least one monomer A-I that imparts the chemically reactive functionality (and therefore the reaction with fibers B). In that case, these can also be referred to as, for example: polystyrene (A-I) copolymer, styrene-acrylonitrile (A-I) copolymer, α-methylstyrene acrylonitrile (A-I) copolymer, impact-modified acrylonitrile-styrene (A-I) copolymer, especially acrylonitrile-butadiene-styrene (A-I) copolymer (ABS-(A-I)) and acrylonitrile-styrene-acrylic ester (A-I) copolymer (ASA-(A-I)). Blends of the copolymers mentioned with polycarbonate or polyamide are also possible.

It is optionally possible for the aforementioned polymer components, in their use as polymer component (A-a), to also additionally comprise a second monomer (or even a third monomer) that imparts the chemically reactive functionality.

By way of example, therefore, the aforementioned polymer components (in their use as polymer component (A-a)), in the case of use of maleic anhydride (MA) as monomer A-I, can also be referred to as, for example: polystyrene-maleic anhydride copolymer, styrene-acrylonitrile-maleic anhydride copolymer, α-methylstyrene-acrylonitrile-maleic anhydride copolymer, impact-modified acrylonitrile-styrene-maleic anhydride copolymer, especially acrylonitrile-butadiene-styrene-maleic anhydride copolymer (ABS-MA) and acrylonitrile-styrene-acrylic ester-maleic anhydride copolymer (ASA-MA). Blends of the copolymers mentioned with polycarbonate or polyamide are also possible. It will be appreciated that the same also applies to other monomers A-I.

It is optionally possible to use any one or more other (co)polymers having no such functionality (as polymer component (A-b)) in addition to the one or more polymer component(s) (A-a). Here too, it is possible, by way of example, to use the aforementioned (co)polymers (and so polystyrene, styrene-acrylonitrile copolymers, α-methylstyrene-acrylonitrile copolymers, impact-modified acrylonitrile-styrene copolymers, especially acrylonitrile-butadiene-styrene copolymers (ABS) and acrylonitrile-styrene-acrylic ester copolymers (ASA), and also blends of the copolymers mentioned with polycarbonate or polyamide), but in that case, without the functionality (and so without reactive monomer A-I).

More preferably, polymer component (A-a) of the thermoplastic molding compound A is based on a SAN copolymer.

It will be apparent to the person skilled in the art that the SAN copolymer in that case additionally comprises a monomer A-I that reacts with the surface of the fibers B during the production process.

Accordingly, the SAN copolymer in its use as polymer component (A-a) may also be an SAN-(M-I) copolymer (=SAN-(M-I) terpolymer), by way of example an SAN-MA copolymer (=SAN-MA terpolymer).

In a further embodiment, the invention particularly relates to a process as described above, wherein the chemically reactive functionality of the thermoplastic molding compound A is based on components selected from the group consisting of maleic anhydride function, N-phenylmaleimide function, tert-butyl (meth)acrylate function and glycidyl (meth)acrylate function, for instance selected from the group consisting of maleic anhydride function, N-phenylmaleimide function and glycidyl (meth)acrylate function.

In a further embodiment, the invention relates to a process as described above, wherein the thermoplastic molding compound A is produced using at least 0.1% by weight, often 0.15% to 5% by weight, preferably 0.1% 3% by weight, of monomers (A-I), based on component A, that have a chemically reactive functionality.

In a further embodiment, the invention relates to a process as described above, wherein the surface of the reinforcing fibers B comprises one or more functions from the group of hydroxyl, ester and amino groups.

In a further embodiment, the invention relates to a process as described above, wherein component A is produced from 65% to 80% by weight of at least one vinylaromatic monomer, 19.9% to 32% by weight of acrylonitrile and 0.1% to 5% by weight of a monomer (A-I) having a chemically reactive functionality, and wherein the sheetlike structure F is a scrim, a weave, a mat, a nonwoven or a knit.

The person skilled in the art will be aware that sheetlike structures F differ from short fibers since, in the former case, larger sheetlike structures that will generally be longer than 5 mm are formed. The person skilled in the art will be aware that the sheetlike structures here are preferably present in such a form that they (largely) permeate the fiber composite material. Therefore, the sheetlike structures F are preferably in such a form that they (largely) permeate the fiber composite material. "Largely permeate" means here that the sheetlike structures F permeate more than 50%, preferably at least 70% and especially at least 90% of the length of the fiber composite material. The length of the fiber composite material here is the greatest extent in any of the three spatial directions. With greater preference, the sheetlike structures F permeate more than 50%, preferably at least 70% and especially at least 90% of the area of the fiber composite material. The area here is the area of the greatest extent in two of the three spatial directions. The fiber composite material is preferably (largely) two-dimensional.

In a further embodiment, the invention relates to a process as described above, wherein component A is produced from 65% to 80% by weight of (α-methyl)styrene, 19.9% to 32% by weight of acrylonitrile and 0.1% to 3% by weight of maleic anhydride, and wherein the sheetlike structure F is a scrim, a weave, a mat, a nonwoven or a knit.

More preferably, the maleic anhydride content in component A is 0.2% to 2% by weight, even more preferably 0.33% to (about) 1% by weight, especially (about) 1% by weight (and so 0.5% to 1.49% by weight), as apparent from the experimental examples.

In a further embodiment, the invention relates to a process as described above, wherein the reinforcing fibers B consist of glass fibers (preferably) comprising silane groups at the surface as chemically reactive functionality.

In a further embodiment, the invention relates to a process as described above, wherein the reinforcing fibers B consist of glass fibers (preferably) comprising silanol groups at the surface as chemically reactive functionality.

In a further embodiment, the invention relates to a process as described above, wherein the fiber composite material has a ribbed structure or a sandwich structure and a layered construction. The process steps for formation of a ribbed structure are known to those skilled in the art.

In a further embodiment, the invention relates to the use of a thermoplastic fiber composite material as described above, wherein the fiber composite material has a layered construction and comprises more than two, often more than three, layers. By way of example, all the layers may be the same and in accordance with the invention, or some of the layers may have a different construction than that of the invention.

In a further embodiment, the invention relates to a process as described above, wherein the temperature for production of the fiber composite material (especially in step (iii)) is at least 200° C., preferably at least 250° C. and more preferably at least 300° C.

In a further embodiment, the invention relates to a process as described above, wherein the residence time for production of the fiber composite material at temperatures of at least 200° C. is not more than 10 minutes, preferably not more than 5 minutes, more preferably not more than 2 minutes and especially not more than 1 minute. The thermal treatment often takes from 10 to 60 seconds.

In a further embodiment, the invention relates to a fiber composite material produced by a process as described above. In a further embodiment, the invention relates to the use of a fiber composite material as described above for production of molded bodies, films and coatings.

Component A

The fiber composite material comprises at least 20% by weight, generally at least 30% by weight, based on the total weight of the fiber composite material, of the thermoplastic matrix M or the thermoplastic molding compound A. The thermoplastic matrix M comprising the thermoplastic molding compound A is present in the fiber composite material at preferably from 30% to 95% by weight, more preferably from 32% to 90% by weight, often from 35% to 80% by weight and especially from 38% to 70% by weight, based on the fiber composite material. Preferably, the thermoplastic matrix M corresponds to the thermoplastic molding compound A.

Preferably, the thermoplastic molding compound A consists mainly (to an extent of more than 50%) of polystyrene or a copolymer (A-1). In one embodiment, the thermoplastic molding compound A consists to an extent of at least 75% by weight, preferably to an extent of at least 90% by weight, of the copolymer A-1. The thermoplastic molding compound A may also consist solely of copolymer A-1.

Any thermoplastics are useful as thermoplastic molding compound A for a fiber composite material of the invention, but especially styrene copolymers are used, especially SAN, SMMA (styrene-methyl methacrylate copolymers), ABS and ASA, and also polystyrene (glass-clear, "PS") or else impact-resistant polystyrene (high impact polystyrene, "HIPS").

As already set out above, the person skilled in the art will appreciate that, in accordance with the invention, at least one of the (co)polymer components of the thermoplastic molding compound A is a (co)polymer having at least one chemically reactive functionality as described herein (polymer component (A-a)). It is preferable, accordingly, that at least one of the aforementioned polymer components (and therefore at least one (optionally modified) polystyrene and/or at least one copolymer A-1 (styrene copolymer, especially SAN, SMMA, ABS and ASA)) comprises at least one monomer A-I.

By way of example, in the case of use of maleic anhydride (MA) as monomer A-I, the polystyrene may therefore be a polystyrene-maleic anhydride copolymer (S-MA); copolymer A-1 may, by way of example, be styrene-acrylonitrile-maleic anhydride copolymer (SAN-MA), styrene-methyl methacrylate-maleic anhydride copolymer (SMMA-MA), acrylonitrile-butadiene-styrene-maleic anhydride copolymer (ABS-MA), acrylonitrile-styrene-acrylonitrile-maleic anhydride copolymer (ASA-MA).

Optionally, in addition to the at least one polymer component (A-a), it is possible to use any one or more further (co)polymers without any such functionality (as polymer component (A-b)). It will be appreciated that this may optionally also be polystyrene, SAN, SMMA, ABS and/or ASA (in each case not comprising any monomer A-I).

The thermoplastic molding compound A (component A) is preferably an amorphous molding compound, the amorphous state of the thermoplastic molding compound (thermoplastic) meaning that the macromolecules are arranged entirely randomly without regular arrangement and orientation, i.e. without constant separation.

Preferably, the entire thermoplastic molding compound A has amorphous thermoplastic properties, and is therefore fusible and (substantially) noncrystalline. As a result, the shrinkage of the thermoplastic molding compound A, and therefore also of the entire fiber composite material, is comparatively low. It is possible to obtain particularly smooth surfaces in the moldings.

As an alternative, component A comprises a semicrystalline component, of less than 60% by weight, preferably less than 50% by weight, more preferably less than 40% by weight, based on the total weight of component A. Semicrystalline thermoplastics form both chemically regular and geometric regions, meaning that there are regions in which crystallites form. Crystallites are parallel-bundled arrangements of sections of molecules or folds of chains of molecules. Individual chain molecules may partly traverse the crystalline or amorphous region. They can sometimes even belong to two or more crystallites at the same time.

The thermoplastic molding compound A may be a blend of amorphous thermoplastic polymers and semicrystalline polymers.

The thermoplastic molding compound A may, for example, be a blend of a styrene copolymer with one or more polycarbonate(s) and/or one or more semicrystalline polymers (such as polyamide), where the proportion of semicrystalline blend components in the overall component A should be less than 50% by weight, preferably less than 40% by weight.

According to the invention, the thermoplastic molding compound A used comprises polystyrene or at least one copolymer A-1 comprising monomers A-I which enter into covalent bonds with the functional groups B-I of the embedded reinforcing fibers B. The proportion of monomers A-I in the thermoplastic molding compound A may be chosen in a variable manner. The higher the proportion of monomers A-I and of the functional groups (B-I), the stronger it is also possible for the bond to be between the thermoplastic molding compound A and the reinforcing fibers B. Monomers A-I may still be present as monomers in copolymer A-1 or may be integrated into the copolymer A-1. Preferably, the monomers A-I are integrated into the copolymer A-1.

In a preferred embodiment, the copolymer A-1 is formed with a proportion of monomers A-I of at least 0.1% by weight, preferably of at least 0.5% by weight, especially of at least 1% by weight, for example 1% to 3% by weight, based on copolymer A-1. Useful monomers A-I which can enter into covalent bonds with the functional groups B-I of the fibers B include all monomers that have properties of this kind. Preferred monomers A-I here are those which can enter into covalent bonds through reaction with hydroxyl or amino groups.

Preferably, the monomers A-I have:
(a) at least one functionality capable of entering into covalent bonds with the functional groups B-I on the surface of the fibers B (for instance by reaction with hydroxyl and/or amino groups); and
(b) at least one second functionality capable of being incorporated into the copolymer A-1, for example a double bond, preferably a terminal double bond which is incorporated into the copolymer A-1 by means of free-radical polymerization.

Optionally, the copolymer A-1 or else another (co)polymer present in the thermoplastic molding compound A may contain one or more further monomers capable of entering into covalent or noncovalent bonds with the fibers B.

In a preferred embodiment, the monomers A-I are selected from the group consisting of:
maleic anhydride (MA),
N-phenylmaleimide (PM),
tert-butyl (meth)acrylate and
glycidyl (meth)acrylate (GM).

In a more preferred embodiment, the monomers A-I are selected from the group consisting of maleic anhydride (MA), N-phenylmaleimide (PM) and glycidyl (meth)acrylate (GM).

It is also possible for two of these monomers A-I to be present in the copolymer A-1.

The copolymer A-1 of the thermoplastic molding compound A may optionally include further functional monomers A-II.

The matrix component M comprises at least one thermoplastic molding compound A, especially one suitable for the production of fiber composite materials. Preference is given to using amorphous thermoplastics for the molding compound A. For example, styrene copolymers are used, such as styrene-acrylonitrile copolymers (SAN) or α-methylstyrene-acrylonitrile copolymers (AMSAN), impact-modified styrene-acrylonitrile copolymers, such as acrylonitrile-butadiene-styrene copolymers (ABS), styrene-methyl methacrylate copolymers (SMMA), methacrylate acrylonitrile-butadiene-styrene copolymers (MABS) or acrylic ester-styrene-acrylonitrile copolymers (ASA).

Blends of the aforementioned copolymers with polycarbonate or semicrystalline polymers such as polyamide are also suitable, provided that the proportion of semicrystalline blend components in component A is less than 50% by weight. Very particular preference is given to using ABS copolymers (with modification by monomers A-I) as thermoplastic molding compound A.

It will be appreciated that at least one of the polymer components in the thermoplastic molding compound A has been modified here with monomer A-I (polymer component (A-a)); preferably, one or more of the aforementioned styrene copolymers has been modified with monomer A-I.

Any other polymer components (for instance styrene copolymers, preferably those as specified above) that have optionally not been modified with monomer A-I (polymer component A-b)) may optionally additionally be present in the thermoplastic molding compound A.

Blends of the aforementioned copolymers (one or more polymer components (A-a) and optionally (A-b)) with polycarbonate or semicrystalline polymers such as polyamide are also suitable, provided that the proportion of semicrystalline blend components in component A is less than 50% by weight. Very particular preference is given to using SAN-(M-I) copolymers (with modification by monomers A-I) as a constituent (optionally even as the sole polymeric constituent) of the thermoplastic molding compound A.

A modified (α-methyl)styrene-acrylonitrile copolymer used in accordance with the invention (as polymer component (A-a)) as thermoplastic molding compound A is prepared from, based on the (α-methyl)styrene-acrylonitrile copolymer, 58% to 85% by weight, preferably 65% to 80% by weight, of (α-methyl)styrene, 14.9% to 37% by weight, preferably 19.9% to 32% by weight, of acrylonitrile and 0.1% to 5% by weight, preferably 0.1% to 3% by weight, of maleic anhydride.

Mention should also be made of mixtures of styrene-acrylonitrile copolymer with α-methylstyrene-acrylonitrile copolymer.

An acrylonitrile-butadiene-styrene copolymer of the invention as thermoplastic molding compound A is prepared by known methods from styrene, acrylonitrile, butadiene and a functional further monomer A-I, for example methyl methacrylate.

The modified ABS copolymer may contain, for example: up to 70% by weight (for instance 35% to 70% by weight) of butadiene, up to 99.9% by weight (for instance 20% to 50% by weight) of styrene and up to 38% by weight (for instance 9% to 38% by weight) of acrylonitrile, and also 0.1% to 20% by weight, preferably 0.1% to 10%, more preferably 0.1% to 5%, especially 0.1% to 3% by weight, of a monomer A-I such as maleic anhydride. Component A can also be prepared from 3% up to 70% by weight (for instance 35% to 70% by weight) of at least one conjugated diene, up to 99.9% by weight (for instance 20% to 50% by weight) of at least one vinylaromatic monomer and up to 38% by weight (for instance 9% to 38% by weight) of acrylonitrile and 0.1% to 20% by weight, preferably 0.1% to 10%, more preferably 0.1% to 5%, especially 0.1% to 3% by weight, of a monomer A-I such as maleic anhydride.

In a preferred embodiment, the modified ABS copolymer (as polymer component (A-a)) may comprise: 35% to 70% by weight of butadiene, 20% to 50% by weight of styrene and 9% to 38% by weight of acrylonitrile, and 0.1% to 5% by weight, preferably 0.1% to 3% by weight, of a monomer A-I such as maleic anhydride. Component A can also be prepared from 35% to 70% by weight of at least one conjugated diene, 20% to 50% by weight of at least one vinylaromatic monomer and 9% to 38% by weight of acrylonitrile, and also 0.1% to 5% by weight, preferably 0.1% to 3% by weight, of a monomer A-I such as maleic anhydride.

An (α-methyl)styrene-methyl methacrylate copolymer of the invention (as polymer component (A-a)) as thermoplastic molding compound A is prepared from, based on the (α-methyl)styrene-methyl methacrylate copolymer, at least 50% by weight, preferably 55% to 95% by weight, more preferably 60% to 85% by weight, of (α-methyl)styrene and 5% to 45% by weight, preferably 15% to 40% by weight, of methyl methacrylate. The (α-methyl)styrene-methyl methacrylate copolymer may be a random copolymer or may have a block polymer construction. Component A may also be prepared from, based on component A, at least 50% by weight, preferably 55% to 95% by weight, more preferably 60% to 85% by weight, of vinylaromatic monomer and 5% to 45% by weight, preferably 15% to 40% by weight, of methyl methacrylate.

In a further preferred embodiment, component A of the invention is a styrene/butadiene copolymer, for example impact-resistant polystyrene, a styrene-butadiene block copolymer, for example Styrolux®, Styroflex®, K-Resin, Clearen, Asaprene, a polycarbonate, an amorphous polyester or an amorphous polyamide.

The person skilled in the art will appreciate that, in accordance with the invention, at least one of the (co)polymer components of the thermoplastic molding compound A is a (co)polymer having at least one chemically reactive functionality as described herein (polymer component (A-a)). This may also be a polymer component as described above having at least one functional monomer A-I in said molding compound. It is optionally possible to use any one or more further (co)polymers having no such functionality (as polymer component (A-b)).

In a further embodiment, the matrix M may consist of at least two different thermoplastic molding compounds A. These different types of molding compound may have, for example, a different melt flow index (MFI), and/or different comonomers or additives.

According to the invention, the term "molecular weight" (Mw) can be understood in the broadest sense to mean the mass of a molecule or a region of a molecule (for example a polymer strand, a block polymer or a small molecule), which can be reported in g/mol (Da) and kg/mol (kDa). Preferably, the molecular weight (Mw) is the weight average, which can be determined by means of the methods known in the prior art. Preferably, the thermoplastic molding compounds A have a molecular weight Mw of 60 000 to 400 000 g/mol, more preferably of 80 000 to 350 000 g/mol, where Mw can be determined by light scattering in tetrahydrofuran (GPC with UV detector). The molecular weight Mw of the thermoplastic molding compounds A can vary within a range of +/−20%.

Preferably, the thermoplastic molding compound A comprises a styrene copolymer modified by a chemically reactive functionality, which, apart from the addition of the monomers A-I, is formed essentially from the same monomers as the "normal styrene copolymer", where the monomer content deviates by +/−5%, the molecular weight by +/−20% and the melt flow index (determined at a temperature of 220° C. and a load of 10 kg by ISO Method 1133) by +/−20%. ISO Method 1133 is preferably understood to mean DIN EN ISO 1133-1:2012-03.

In a preferred embodiment, the melt volume rate (MVR) of the thermoplastic polymer composition A used as polymer matrix is 10 to 70 cm$^3$/10 min, preferably 12 to 70 cm$^3$/10 min, especially 15 to 55 cm$^3$/10 min at 220° C./10 kg (measured according to ISO1133). In a particularly preferred embodiment, the melt volume rate (MVR) of the thermoplastic polymer composition A used as polymer matrix is 10 to 35 cm$^3$/10 min, preferably 12 to 30 cm$^3$/10 min, especially 15 to 25 cm$^3$/10 min at 220° C./10 kg (measured according to ISO1133).

Alternatively, the melt volume rate (MVR) of the thermoplastic polymer composition A used as polymer matrix may be 35 to 70 cm$^3$/10 min, preferably 40 to 60 cm$^3$/10 min, especially 45 to 55 cm$^3$/10 min at 220° C./10 kg (measured according to ISO1133).

Alternatively or additionally, the viscosity number ($J=(\eta/\eta_0-1)\cdot 1/c$) of the thermoplastic polymer composition A used as polymer matrix, determined by means of a capillary viscometer and measured at room temperature (20° C.) for pellets dissolved in dimethylformamide, may be 50 to 100 mL/g, preferably 55 to 85 mL/g. In a preferred embodiment, the viscosity number is 55 to 75 mL/g, preferably 60 to 70 mL/g, especially 61 to 67 mL/g. In an alternative preferred embodiment, the viscosity number is 60 to 90 mL/g, preferably 65 to 85 mL/g, especially 75 to 85 mL/g.

Suitable preparation processes for component A are emulsion, solution, bulk or suspension polymerization, preference being given to solution polymerization (see GB 1472195). In a preferred embodiment of the invention, component A is isolated after the preparation by methods known to those skilled in the art and preferably processed to pellets. This may be followed by the production of the fiber composite material.

Component B

The fiber composite material (organosheet) contains at least 5% by weight, based on the fiber composite material, of the reinforcing fiber B (component B). The reinforcing fiber B is present in the fiber composite material at preferably from 5% to 70% by weight, more preferably from 10% to 65% by weight, often from 20% to 60% by weight and especially from 29.9% to 61.9% by weight, based on the fiber composite material.

The reinforcing fiber B is used as sheetlike structure F. The reinforcing fibers B may be any fiber having a surface which has functional groups B-I that can enter into a covalent bond with the monomers A-I of component A.

In a preferred embodiment, the functional groups B-I at the surface of the reinforcing fibers B are selected from hydroxyl, ester and amino groups. Particular preference is given to hydroxyl groups.

In a more preferred embodiment, the reinforcing fibers B are glass fibers having hydroxyl groups at the surface in the form of silanol groups as chemically reactive functionality B-I.

The reinforcing fibers B may be embedded in the fiber composite material as sheetlike structure F in any orientation and arrangement. The reinforcing fibers B are present in the fiber composite material not in random homogeneous distribution, but as a sheetlike structure, i.e. in planes having a higher proportion and those having a lower proportion (and so as more or less separate plies). The starting point is preferably a laminate-like or laminar construction of the fiber composite material.

The sheetlike structure F of the reinforcing fibers B may take the form, for example, of weaves, mats, nonwovens, scrims or knits.

Flat laminates formed in this way contain composites of sheetlike reinforcing plies (of reinforcing fibers B) built up layer by layer and plies of the polymer matrix that wets and coheres these, comprising at least one thermoplastic molding compound A. In a preferred embodiment, the reinforcing fibers B are embedded layer by layer in the fiber composite material. The reinforcing fibers B preferably take the form of a sheetlike structure F.

In a scrim, the fibers are ideally in parallel and stretched form. Usually, endless fibers are used. Weaves form through the weaving of endless fibers, for example of rovings. The weaving of fibers is necessarily accompanied by undulation of the fibers. The undulation especially brings about lowering of the fiber-parallel compressive strength. Mats usually consist of short and long fibers loosely bonded by means of a binder. By virtue of the use of short and long fibers, the mechanical properties of components made from mats are inferior to those of weaves. Nonwovens are structures formed from fibers of limited length, endless fibers (filaments) or cut yarns of any length and any origin that have been joined to form a nonwoven in some way and have been bonded to one another in some way. Knits are thread systems resulting from mesh formation.

The sheetlike structure F is preferably a scrim, a weave, a mat, a nonwoven or a knit. A particularly preferred sheetlike structure F is a scrim or a weave.

Component C

As a further component C, the fiber composite material used optionally contains 0% to 40% by weight, preferably 0% to 30% by weight, more preferably 0.1% to 25% by weight, based on the sum of components A to C, of one or more additives different from components A and B (auxiliaries and additives).

Mention should be made of particulate mineral fillers, processing auxiliaries, stabilizers, oxidation retardants, thermal decomposition stabilizers and ultraviolet decomposition stabilizers, lubricants and demolding aids, flame retardants, dyes and pigments, and plasticizers.

Mention should also be made of esters as low molecular weight compounds. According to the present invention, it is also possible to use two or more of these compounds. In general, the compounds are present with a molar mass of less than 3000 g/mol, often less than 150 g/mol.

Particulate mineral fillers may be provided, for example, by amorphous silica, carbonates such as magnesium carbonate, calcium carbonate (chalk), powdered quartz, mica, a wide variety of different silicates such as alumina, muscovite, biotite, suzoite, tin maletite, talc, chlorite, phlogopite, feldspar, calcium silicates such as wollastonite or kaolin, especially calcined kaolin.

UV stabilizers include, for example, various substituted resorcinols, salicylates, benzotriazoles and benzophenones, which can generally be used in amounts of up to 2% by weight.

According to the invention, oxidation retardants and thermal stabilizers can be added to the thermoplastic molding compound. Sterically hindered phenols, hydroquinones, substituted representatives of this group, secondary aromatic amines, optionally in conjunction with phosphorus acids or salts thereof, and mixtures of these compounds, are usable preferably in concentrations of up to 1% by weight, based on the weight of the mixture.

In addition, it is possible according to the invention to add lubricants and demolding agents which generally in amounts of up to 1% by weight of the thermoplastic composition. Mention should be made here of stearic acid, stearyl alcohol, alkyl stearates and stearamides, preferably Irganox®, and esters of pentaerythritol with long-chain fatty acids. It is possible to use the calcium, zinc, aluminum salts of stearic acid, and also dialkyl ketones, for example distearyl ketone. In addition, it is also possible to use ethylene oxide-propylene oxide copolymers as lubricants and demolding agents. In addition, it is possible to use natural and synthetic waxes. These include PP waxes, PE waxes, PA waxes, grafted PO waxes, HDPE waxes, PTFE waxes, EBS waxes, montan wax, carnauba wax and beeswax.

Flame retardants may either be halogenated or halogen-free compounds. Suitable halogen compounds, where brominated compounds are preferable over the chlorinated compounds, remain stable in the course of production and processing of the molding compound of the invention, such that no corrosive gases are released and the efficacy is not impaired thereby. Preference is given to using halogen-free compounds, for example phosphorus compounds, especially phosphine oxides and derivatives of acids of phosphorus and salts of acids and acid derivatives of phosphorus. More preferably, phosphorus compounds contain ester, alkyl, cycloalkyl and/or aryl groups. Likewise suitable are oligomeric phosphorus compounds having a molecular weight of less than 2000 g/mol as described, for example, in EP-A 0 363 608.

Pigments and dyes may also be present. These are generally present in amounts of 0% to 15%, preferably 0.1% to 10% and especially 0.5% to 8% by weight, based on the sum total of components A to C. The pigments for coloring thermoplastics are common knowledge; see, for example, R. Gächter and H. Müller, Taschenbuch der Kunststoffadditive [Handbook of Plastics Additives], Carl Hanser Verlag, 1983, p. 494 to 510. Mention should be made, as the first preferred group of pigments, of white pigments such as zinc oxide, zinc sulfide, lead white (2 $PbCO_3.Pb(OH)_2$), lithopone, antimony white and titanium dioxide. Of the two most common crystal polymorphs (rutile and anatase type) of titanium dioxide, the rutile form in particular is used for whitening of the molding compounds of the invention.

Black color pigments that can be used in accordance with the invention are iron oxide black ($Fe_3O_4$), spinel black ($Cu(Cr,Fe)_2O_4$), manganese black (mixture of manganese dioxide, silicon oxide and iron oxide), cobalt black and antimony black, and more preferably carbon black, which is usually used in the form of furnace black or gas black (in this regard see G. Benzing, Pigmente für Anstrichmittel [Pigments for Paints], Expert-Verlag (1988), p. 78ff). It is of course possible in accordance with the invention to establish particular hues by using inorganic chromatic pigments such as chromium oxide green or organic chromatic pigments such as azo pigments and phthalocyanines. Pigments of this kind are generally commercially available. It can also be advantageous to use the pigments or dyes mentioned in a mixture, for example carbon black with copper phthalocyanines, since color dispersion in the thermoplastics is generally facilitated.

Process for Producing the Fiber Composite Materials (Organosheets)

Preferably, organosheets are processed by the injection molding or pressing method. It is thus possible to generate a further cost advantage through integration of function, for example the attachment of functional elements by injection molding or compression, since it is possible to dispense with further assembly steps, for example the attachment of functional elements by welding.

The process for producing a fiber composite material comprises the following steps:

(i) providing:
- (A) at least one thermoplastic molding compound A as matrix M, comprising (or consisting of) polystyrene or at least one copolymer A-1 comprising monomers A-I (and optionally one or more further (co)polymers (A-a) and/or (A-b));
- (B) at least one sheetlike structure composed of reinforcing fibers B, the surface of which has functional groups B-I which can enter into a covalent bond with the monomers A-I;
- (C) optionally at least one additive C;

(ii) introducing the at least one sheetlike structure F into a thermoplastic matrix M; and (iii) reacting at least some of the monomers A-I of the polystyrene or the copolymer A-1 with at least some of the functional groups B-I of the at least one reinforcing fiber B from step (ii) to form covalent bonds.

The production process may comprise the phases of impregnation, consolidation and solidification that are customary in the production of composite materials, and the operation can be affected via the choice of temperature, pressure and times allowed.

In a preferred embodiment, the fiber composite material comprises (or consists of):
a) 30 to 95% by weight of at least one thermoplastic molding compound A,
b) 5% to 70% by weight of at least one reinforcing fiber B, and
c) 0% to 40% by weight, often 0.1% to 25% by weight, of at least one additive C.

The introduction of the at least one sheetlike structure F into a thermoplastic matrix M of step (ii) is preferably effected via melting of the thermoplastic molding compound A and contacting of the latter with at least one sheetlike structure F composed of reinforcing fibers B from step (i).

Step (ii) of the process, the melting of the thermoplastic molding compound A and the contacting of this melt with the reinforcing fibers B, can be effected in any manner suitable for the purpose. In such an impregnation, the matrix M, consisting of at least one thermoplastic molding compound A, can be converted to a free-flowing state and the reinforcing fibers B can be wetted to form an interface layer.

Steps (ii) and (iii) can also be conducted simultaneously. In that case, the contacting of the thermoplastic molding compound A with the reinforcing fibers B is followed immediately by a chemical reaction in which the monomers A-I form a covalent bond with the surface of the reinforcing fibers B (generally via a bond to the functional groups B-I). This can, by way of example, be an esterification (e.g. the esterification of maleic anhydride monomers with silanol groups of a glass fiber). Alternatively, the formation of a covalent bond can also be initiated in a separate step (for example by an increase in temperature, free-radical initiators and/or photoinitiation). This can be conducted at any suitable temperature.

Steps (ii) and/or (iii) are conducted at a temperature of at least 200° C., preferably at least 250° C., more preferably at least 300° C., especially 300° C.-340° C.

It should preferably be ensured here that a minimum level of pyrolysis occurs and the components used are not subject to thermal decomposition (or only to a minor degree (and so to an extent of <50%)). One exception here may be as follows: a composition that releases reactive groups through thermal elimination, for example tert-butyl (meth)acrylate, where thermal elimination at temperatures over and above about 200° C. releases isobutene and the remaining functional group (essentially an acid function) can then react with the fiber surface.

In a preferred embodiment, therefore, in the performance of steps (ii) and/or (iii), the residence time at temperatures of 200° C. is not more than 10 min, preferably not more than 5 min, even more preferably not more than 2 min, especially not more than 1 min. 10 to 60 seconds are often sufficient for the thermal treatment.

The process, especially steps (ii) and (iii), could in principle be conducted at any pressure (preferably atmospheric pressure or elevated pressure), with or without compression attachment of the components. In the case of compression attachment with elevated pressure, it is possible to improve the properties of the fiber composite material.

In a preferred embodiment, therefore, steps (ii) and/or (iii) are conducted at a pressure of 5-100 bar with a pressing time of 10-60 s, preferably at a pressure of 10-30 bar with a pressing time of 15-40 s.

Preference is given to using styrene copolymers provided with at least one chemically reactive functionality (A-I), i.e. amorphous thermoplastic matrices, as thermoplastic molding compound A. It is thus possible to significantly increase the surface quality for the applications described hereinafter compared to the semicrystalline thermoplastics for lining parts of this kind, since the lower shrinkage of the amorphous thermoplastics significantly improves the surface topology, on account of the fiber-rich (crossing point in the case of weaves) and low-fiber regions.

In step (iv), in the consolidation, air pockets in the fiber composite material are reduced and a good bond is established between thermoplastic molding compound A and reinforcing fibers B (especially when they are reinforcing fibers B embedded layer by layer). It is preferable, after impregnation and consolidation, to obtain a (very substantially) pore-free material composite.

Alternatively, said steps can be executed in a separate sequence. For example, it is thus possible to prepare plies of reinforcing fibers B with differently prepared reinforcing fibers B, in which case impregnation of the reinforcing fibers B with the matrix of thermoplastic molding compound A takes place. Thereafter, there may be impregnated plies with reinforcing fibers B having different fiber-matrix adhesion, which can be consolidated in a further operating step to give a material composite as fiber composite material. Before the plies of reinforcing fibers B are laminated with the matrix of thermoplastic molding compound A, it is possible for at least some of the reinforcing fibers B to be subjected to a pretreatment, in the course of which the later fiber-matrix adhesion is influenced. The pretreatment may, for example, be a coating step, an etching step, a heat treatment step or a mechanical surface treatment step. More particularly, for example, it is possible to partly remove an adhesion promoter that has already been applied by heating a portion of the reinforcing fibers B.

The reinforcing plies may be fully bonded to one another in the production process (lamination). Fiber composite material mats of this kind offer optimized strength and stiffness in fiber direction and can be processed further in a particularly advantageous manner.

The process may also comprise the production of a molding T.

In a preferred embodiment, the process comprises, as a further step (v), three-dimensional shaping to give a molding T.

This can be effected in any desired manner, for instance by mechanical shaping by means of a shaping body, which may also be an embossed roller. Preference is given to shaping the still-formable fiber composite material in which the thermoplastic molding compound A is still (partly) in molten form. Alternatively or additionally, it is also possible for a cured fiber composite material to be shaped at low temperature.

In a particularly preferred embodiment, the present invention relates to the process of the invention for production of a thermoplastic fiber composite material, wherein component A is produced from 65% to 80% by weight of (α-methyl)styrene,
19.9% to 32% by weight of acrylonitrile and
0.1% to 3% by weight of maleic anhydride, wherein the sheetlike structure F is a scrim, a weave, a mat, a nonwoven or a knit, and
wherein the residence time for production of the fiber composite material at temperatures of at least 200° C. is not more than 10 minutes.

In a particularly preferred embodiment, the present invention relates to a process for producing a thermoplastic fiber composite material from a thermoplastic matrix M comprising
a) 30% to 95% by weight of an amorphous thermoplastic molding compound A used as matrix M, wherein the thermoplastic molding compound A is produced using at least 0.1% by weight of monomers, based on component A, having a chemically reactive functionality,
especially wherein component A is produced from 65% to 80% by weight of (α-methyl)styrene, 19.9% to 32% by weight of acrylonitrile and 0.1% to 3% by weight (especially 0.33% to 1% by weight) of maleic anhydride and/or wherein the sheetlike structure F is a scrim, a weave, a mat, a nonwoven or a knit,
b) 5% to 70% by weight of the reinforcing fibers B, wherein the reinforcing fibers B consist of glass fibers having silanol groups at the surface as chemically reactive functionality, and
c) 0 to 40% by weight of the additive C,
in which multiple sheetlike structures F composed of reinforcing fibers B are embedded into the matrix M and the thermoplastic molding compound A has at least one chemically reactive functionality, comprising the steps of:
i) providing at least one sheetlike structure F composed of reinforcing fibers B, wherein the surface of the reinforcing fibers B comprises one or more of the functions from the group of hydroxyl, ester and amino groups,
ii) introducing the at least one sheetlike structure F into the thermoplastic matrix M, preferably at a temperature of at least 200° C.,
iii) reacting functional groups in the thermoplastic matrix M with polar groups on the surface of the reinforcing fibers B, wherein the residence time for production of the fiber composite material at temperatures of at least 200° C. is not more than 10 minutes, and
iv) consolidating the fiber composite material,
v) optionally cooling and further process steps,
preferably wherein the fiber composite material has a ribbed structure or a sandwich structure and a layered construction.

Even more preferably, the process or the fiber composite material also has one or more further properties as described herein.

Preferably, at the end of the process, a (largely) solid molding T is obtained.

Preferably, therefore, the process comprises, as a further step (v), the curing of the molding T or of the product obtained from step (iv).

This step can also be referred to as solidification. The solidification, which generally takes place with removal of heat, can subsequently lead to a ready-to-use molding T.

Optionally, the molding T can still be subjected to further processing (e.g. deburred, polished, colored etc.).

The process may proceed continuously, semicontinuously or batchwise.

In a preferred embodiment, the process is conducted as a continuous process, especially as a continuous process for producing smooth or three-dimensionally embossed films.

Alternatively, it is also possible to produce moldings T in a semicontinuous or batchwise manner.

The organosheets have an amorphous thermoplastic matrix M. These can be attached with a ribbed structure by the injection molding method, laminated (welded) as outer layers onto a foamed thermoplastic core or onto a honeycomb core.

The reason for the improvement in the component stiffness via a ribbed structure (formation of a ribbed structure) is the increase in the area moment of inertia. In general, the optimal dimensioning of the rib structure includes production-related, esthetic and construction aspects.

The reinforcing fibers B may be impregnated and consolidated as a sheetlike structure F composed of reinforcing fibers B in a single processing step with the matrix M comprising a thermoplastic molding compound A. The fiber composite material can be produced in a particularly efficient manner in this way.

FIGURES

Figure 1B:
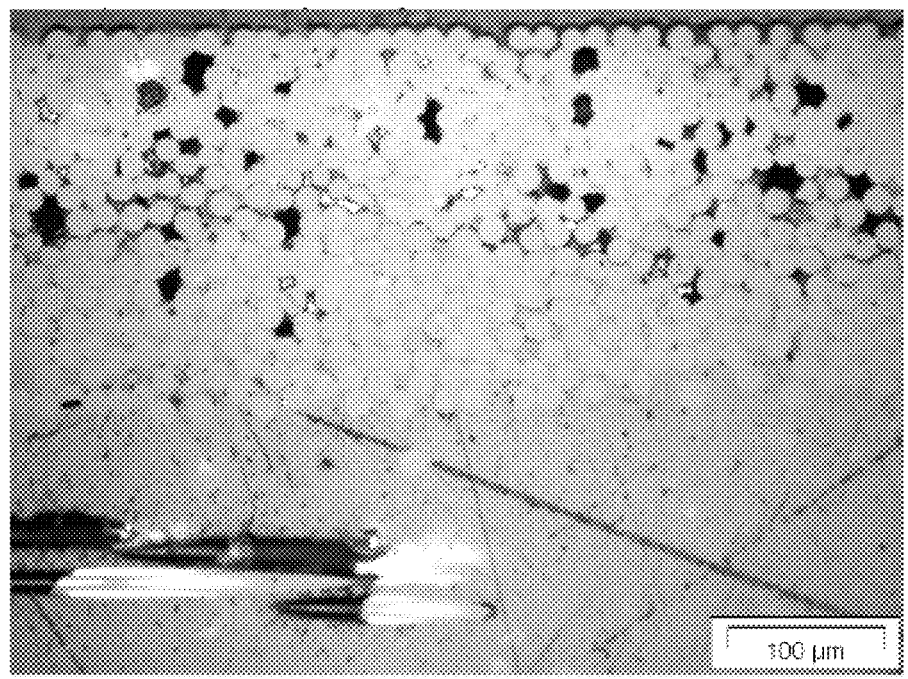

FIG. 1 shows the fiber composite material which have been obtained according to experiment no. 1 (comp.). FIG. 1A shows the microscope view of a section through the laminar fiber composite material arranged in horizontal alignment (on the left: 25-fold magnification, on the right: 50-fold magnification), the fibers being clearly apparent as a horizontal dark-colored layer between the light-colored layers of thermoplastic molding compound. FIG. 1B shows the 200-fold magnification, it being apparent that the impregnation is incomplete at some points.

Figure 2A:
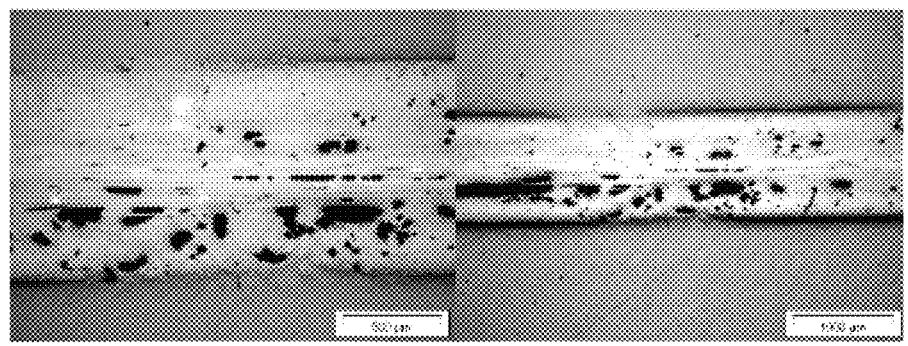
Figure 2B:
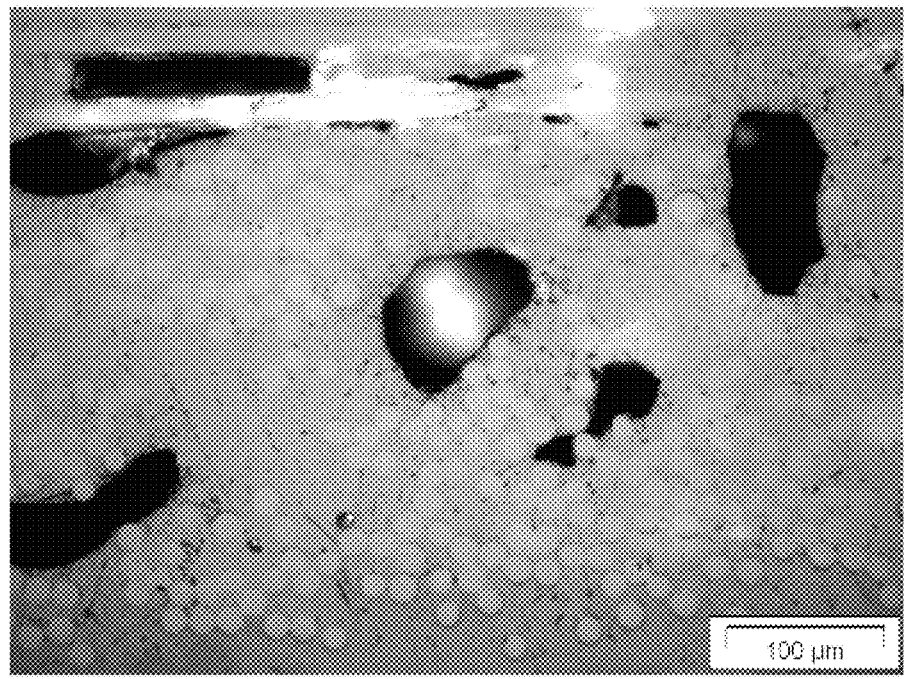

FIG. 2 shows the fiber composite material which have been obtained according to experiment no. 2. FIG. 2A shows the microscope view of a section through the laminar fiber composite material arranged in horizontal alignment (on the left: 25-fold magnification, on the right: 50-fold magnification), with no apparent layer of fibers. FIG. 2B shows the 200-fold magnification, it being apparent that the impregnation is largely complete.

Figure 3A:
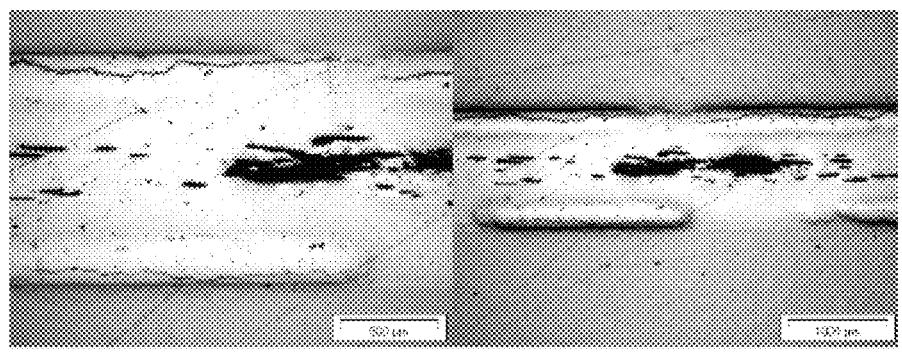
Figure 3B:
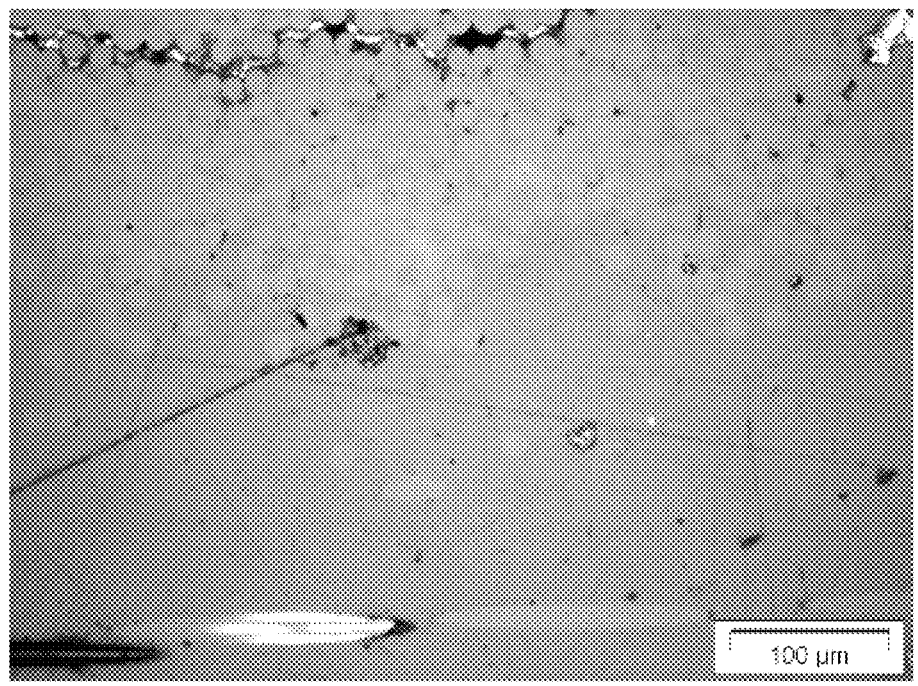

FIG. 3 shows the fiber composite material which have been obtained according to experiment no. 3. FIG. 3A shows the microscope view of a section through the laminar fiber composite material arranged in horizontal alignment (on the left: 25-fold magnification, on the right: 50-fold magnification), with a barely apparent layer of fibers. FIG. 3B shows the 200-fold magnification, it being apparent that the impregnation is incomplete at individual points.

Figure 4A:
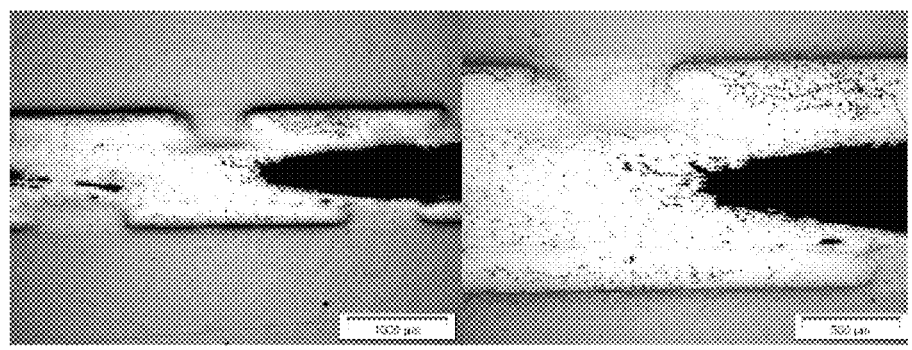
Figure 4B:
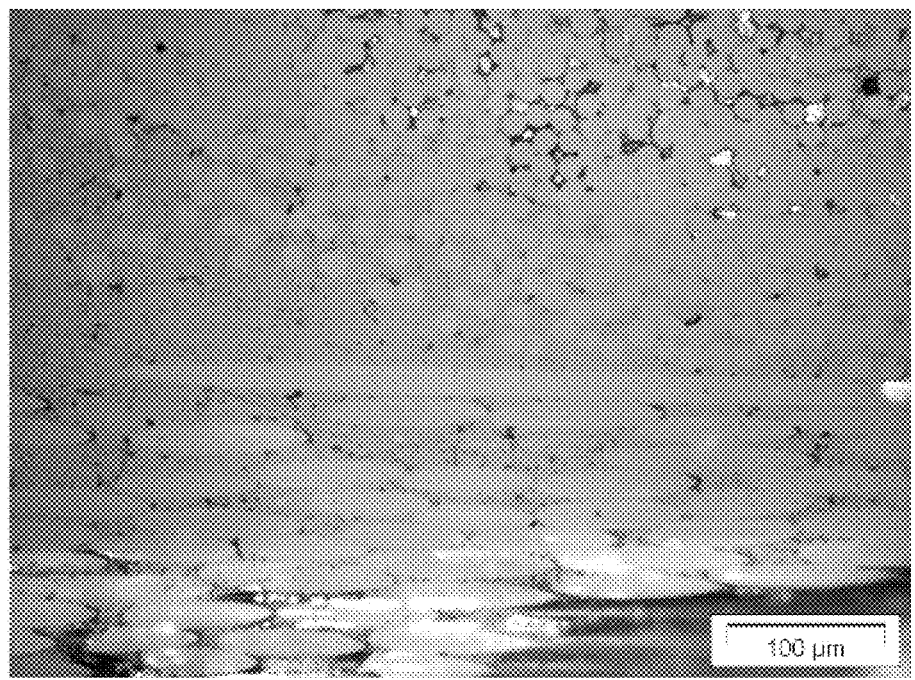

FIG. 4 shows the fiber composite material which have been obtained according to experiment no. 4. FIG. 4A shows the microscope view of a section through the laminar fiber composite material arranged in horizontal alignment (on the left: 25-fold magnification, on the right: 50-fold magnification), with no apparent layer of fibers. FIG. 4B shows the 200-fold magnification, it being apparent that the impregnation is incomplete at a few points.

Figure 5A:
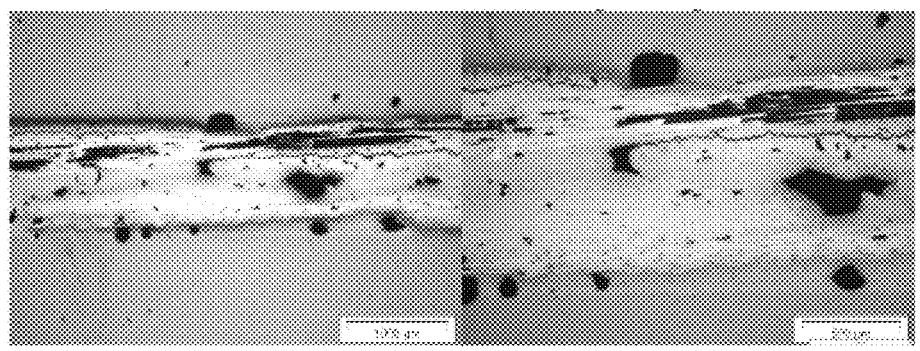
Figure 5B:
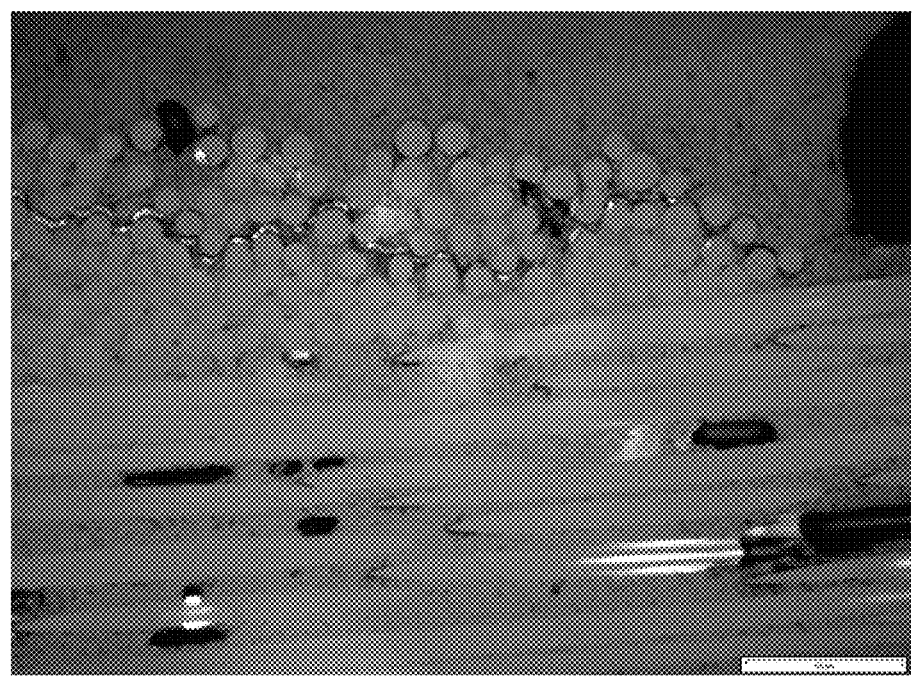

FIG. 5 shows the fiber composite materials which have been obtained according to experiment no. 5. FIG. 5A shows the microscope view of a section through the laminar fiber composite material arranged in horizontal alignment (on the left: 25-fold magnification, on the right: 50-fold magnification), with no apparent layer of fibers. FIG. 5B shows the 200-fold magnification, it being apparent that the impregnation is incomplete at a few points.

Figure 6:
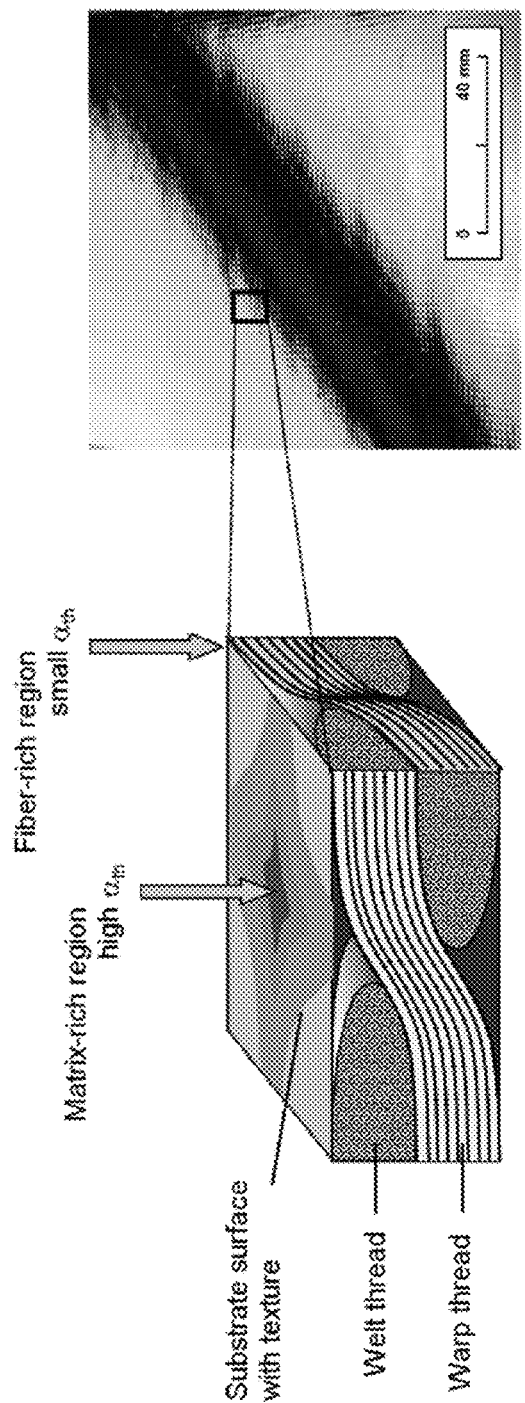

FIG. 6 shows, in schematic form, the development of undesired formation of surface waves (texture).

The invention is described in detail by the examples, figures and claims which follow.

EXAMPLES

Example 1

The experiments which follow were conducted in an intermittent hot press capable of producing a fiber/film composite from polymer film, melt or powder, for quasi-continuous production of fiber-reinforced thermoplastic semifinished products, laminates and sandwich sheets.

Sheet width: 660 mm

Laminate thickness: 0.2 to 9.0 mm

Laminate tolerances: max.±0.1 mm corresponding to semifinished product

Sandwich sheet thickness: max. 30 mm

Output: about 0.1-60 m/h, depending on quality and component thickness

Nominal advance rate 5 m/h

Mold pressure: compression unit 5-25 bar, infinitely adjustable for minimum and maximum mold size (optional)

Mold temperature control: 3 heating zones and 2 cooling zones

Mold temperature: up to 400° C.

Mold length: 1000 mm

Press opening distance: 0.5 to 200 mm

Preferred direction of production: from right to left

Technical data of the melt plastification are:

Discontinuous melt discharge in center position for production of fiber-reinforced thermoplastic semifinished products Screw diameter: 35 mm Max. stroke volume: 192 cm$^3$ Max. screw speed: 350 rpm Max. discharge flow rate: 108 cm$^3$/s Max. discharge pressure: 2406 bar (specific)

Transparency was measured on 1 mm organosheet samples in % of white daylight (100%) (Byk Haze gard i) transparency measurement unit (BYK-gardner, USA) in accordance with ASTM D 1003 (for instance ASTM D 1003-13)).

Components:

A1: styrene-acrylonitrile (S/AN) copolymer with the composition 75% by weight styrene (S) and 25% by weight acrylonitrile (AN), viscosity number 60, Mw 250 000 g/mol (measured via gel permeation chromatography on standard columns with monodisperse polystyrene calibration standards)

A2: S/AN/maleic anhydride (S/AN/MSA) copolymer with the composition (% by weight): 74/25/1; concentration of functional groups: 1% by weight of MA (98.1 g/mol) in 74% by weight of styrene (104.2 g/mol) and 25% by weight of AN (53.1 g/mol), Mw 250 000 g/mol (measured via gel permeation chromatography on standard columns with monodisperse polystyrene calibration standards)

A3: mixture of A2:A1=2:1, concentration of functional groups: 0.67% by weight of MA A4: mixture of A2:A1=1:2, concentration of functional groups: 0.33% by weight of MA B1: bidirectional glass fiber scrim 0/90° with basis weight=approx. 590 g/m$^2$, weft+warp=1200 tex (1200 g/1000 m) [for example KN G 590.1 from P-D Glasseiden GmbH]

B2: 2/2 glass fiber twill weave with basis weight=approx. 576 g/m$^2$, weft+warp=1200 tex [for example GW 123-580K2 from P-D Glasseiden GmbH]

The combinations and parameter settings for the process described in claim 1 are listed in the following table:

TABLE 1

Details of production of the fiber composite materials according to V1 (comp.), V2 to V5.

| Experiment no. | Composite* | Temperature profile | Pressure [bar] | Pressing time [s] | Thickness [mm] |
|---|---|---|---|---|---|
| 1 (comp.) | A1 + B1 | 220-280-300-160-80 | 20 | 30 | 1 |
| 2 | A2 + B1 | 220-280-300-160-80 | 20 | 30 | 1 |
| 3 | A3 + B1 | 220-280-300-160-80 | 20 | 20-30 | 1 |
| 4 | A4 + B1 | 220-280-300-160-80 | 20 | 20-30 | 1 |
| 5 | A2 + B2 | 240-300-320-160-80 | 20 | 20 | 1 |

*Components A + B1: textile construction thickness 0.465 mm, matrix construction thickness 0.653 mm, total matrix volume: 22 mL, proportion by volume of fibers: 41.6%, overall semifinished product density: 1.669 g/mL, total semifinished product thickness: 1.117 mm
Components A + B2: textile construction thickness 0.454 mm, matrix construction thickness 0.653 mm, total matrix volume: 22 ml, proportion by volume of fibers: 41.0%, overall semifinished product density: 1.660 g/ml, total semifinished product thickness: 1.106 mm.

The results for experiments 1 to 5 are summarized below:

Experiment No. 1 (Comparative)

Visual assessment at the semifinished product surface:

Macroimpregnation: complete

Microimpregnation: incomplete at isolated sites

Microscopic assessment within the semifinished product:

Matrix layer in middle ply: barely apparent

Matrix layer in the outer ply: apparent in the roving

Impregnated warp threads: isolated unimpregnated regions in the middle, well-impregnated at the circumference Impregnated weft threads: unimpregnated regions in the middle, lightly impregnated at the circumference Consolidation: inadequate, distinct damage to weft threads apparent The result is shown in FIG. 1.

Experiment No. 2

Visual assessment at the semifinished product surface:

Macroimpregnation: complete

Microimpregnation: complete

Microscopic assessment within the semifinished product:

Matrix layer in middle ply: not apparent

Matrix layer in the outer ply: clearly apparent

Impregnated warp threads: barely any unimpregnated regions apparent, well-impregnated at the circumference Impregnated weft threads: barely any unimpregnated regions apparent, well-impregnated at the circumference Consolidation: good, no damage to warp and weft threads apparent The result is shown in FIG. 2.

Experiment No. 3

Visual assessment at the semifinished product surface:
Macroimpregnation: complete
Microimpregnation: predominantly complete
Microscopic assessment within the semifinished product:
Matrix layer in middle ply: barely apparent
Matrix layer in the outer ply: apparent
Impregnated warp threads: lightly unimpregnated regions apparent, well-impregnated at the circumference
Impregnated weft threads: unimpregnated regions apparent, but impregnated at the circumference
Air pockets: none apparent
Consolidation: satisfactory, moderate damage to weft threads apparent The result is shown in FIG. 3.

Experiment No. 4

Visual assessment at the semifinished product surface:
Macroimpregnation: complete
Microimpregnation: predominantly complete
Microscopic assessment within the semifinished product:
Matrix layer in middle ply: not apparent
Matrix layer in the outer ply: apparent
Impregnated warp threads: few unimpregnated regions apparent, well-impregnated at the circumference
Impregnated weft threads: few unimpregnated regions apparent, well-impregnated at the circumference
Air pockets: none apparent
Consolidation: partly good, partly inadequate, local damage to weft threads apparent The result is shown in FIG. 4.

Experiment No. 5

Visual assessment at the semifinished product surface:
Macroimpregnation: complete
Microimpregnation: predominantly complete
Microscopic assessment within the semifinished product:
Matrix layer in middle ply: not apparent
Matrix layer in the outer ply: apparent
Impregnated warp threads: few unimpregnated regions apparent, well-impregnated at the circumference
Impregnated weft threads: few unimpregnated regions apparent, well-impregnated at the circumference
Air pockets: none apparent
Consolidation: partly good, partly inadequate, local damage to weft threads apparent The result is shown in FIG. 5.

Summary of the Experimental Results

TABLE 2

Summary of the experiments and assessment of the impregnation and consolidation.

| Experiment no. | Composite* | Maleic anhydride concentration (% by wt.) | Max. temperature (° C.) | Impregnation** Macro | Impregnation** Micro | Transparency (%) | Consolidation** |
|---|---|---|---|---|---|---|---|
| 1 (comp.) | A1 + B1 | 0 | 260 | 1 | 5 | 1 | 5 |
| 2 (comp.) | A1 + B1 | 0 | 300 | 1 | 4 | 3 | 4 |
| 3 | A2 + B1 | 1 | 320 | 1 | 1 | 40 | 2 |
| 4 | A3 + B1 | 0.66 | 320 | 1 | 2 | 25 | 3 |
| 5 | A4 + B1 | 0.33 | 320 | 1 | 2 | 20 | 4 |

*Components A + B1: textile construction thickness 0.465 mm, matrix construction thickness 0.653 mm, total matrix volume: 22 mL, proportion by volume of fibers: 41.6%, overall semifinished product density: 1.669 g/mL, total semifinished product thickness: 1.117 mm
Components A + B2: textile construction thickness 0.454 mm, matrix construction thickness 0.653 mm, total matrix volume: 22 ml, proportion by volume of fibers: 41.0%, overall semifinished product density: 1.660 g/ml, total semifinished product thickness: 1.106 mm.
**1 = perfect, 2 = good, 3 = partial, 4 = little, 5 = poor/zero Table 2 shows that the fiber composite materials of the invention (experiment numbers 2 to 4) unexpectedly have improved properties in consolidation and in microimpregnation.

TABLE 3

Optical and tactile comparison of the inventive experimental settings with conventional organosheets

| Experiment no. | Composite | Maleic anhydride concentration (% by wt.) | Surface quality* | Printability with 45 mdyne ink** | Transparency (%) |
|---|---|---|---|---|---|
| 1 (comp.) | A1 + B1 | 0 | 2 | 1 | 1 |
| 2 (comp.) | A1 + B1 | 0 | 2 | 1 | 3 |
| 3 | A2 + B1 | 1 | 1-2 | 1 | 40 |
| 4 | A3 + B1 | 0.66 | 1-2 | 1 | 25 |
| 5 | A4 + B1 | 0.33 | 1-2 | 1 | 20 |
| 6 | bond laminates composite composed of about 60% glass fiber weave and 40% polyamide | 0 | 4-5 | 1 | 0 |
| 7 | composite composed of about 60% glass fiber weave and 40% polyamide | 0 | 4-5 | 5 | 0 |

*1 = completely smooth, 2 = substantially smooth, 3 = slightly rough, 4 = moderately rough, 5 = fibers clearly perceptible
**1 = perfect, 2 = good, 3 = partial, 4 = little, 5 = poor/zero

Experiment No. 6

The results are shown in table 5.

The combinations and parameter settings run in connection with experiment no. 6 are listed in the following table:

TABLE 4

Production conditions of the fiber composite materials W

| Experiment no. | Composite* | Temperature profile | Pressure (bar) | Pressing time (s) | Thickness (mm) |
|---|---|---|---|---|---|
| 4 | A1 + B1 | 220-240-300-160-80 | 20 | 20 | 1 |
| 12 | A3 + B1 | 220-240-300-160-80 | 20 | 20 | 1 |
| 28 | A1 + B2 | 240-300-320-160-80 | 20 | 20 | 1 |
| 26 | A3 + B2 | 240-300-320-160-80 | 20 | 30 | 1 |

*Components A + B1: textile construction thickness 0.465 mm, matrix construction thickness 0.653 mm, total matrix volume: 22 mL, proportion by volume of fibers: 41.6%, overall semifinished product density: 1.669 g/mL, total semifinished product thickness: 1.117 mm

TABLE 5

Comparison of flexural strength.

| | Experiment no. | | | | | |
|---|---|---|---|---|---|---|
| | 8 | 9 | Delta (%) | 10 | 11 | Delta (%) |
| Reinforcement | scrim (B1), warp direction | | | 2/2 twill weave (B2) | | |
| Matrix | A1 | A3 | | A1 | A3 | |
| | Flexural test: | | | | | |
| Modulus (GPa) | 19.7 | 22.5 | 14 | 21.1 | 19.6 | −7 |
| Breaking stress (MPa) | 211 | 462 | 119 | 423 | 528 | 25 |

Table 5 shows the fiber composite materials W obtained in a test series. In each case, pure SAN (A1) and an S/AN/maleic anhydride copolymer (A2) were combined with a commercial scrim and weave reinforcement in an identical process and tested. The fiber volume content of the composites was 42%. The improved quality of the impregnation and bonding between fiber and matrix is not shown in the flexural stiffness, but is clearly shown in the flexural strength (breaking stress) of the samples examined.

Experiment No. 7

The results are shown in table 6.

TABLE 6

Comparison of wave depth Wt.

| | Experiment no. | | |
|---|---|---|---|
| | 12 | 13 | 14 |
| | Reinforcement Fiber (B3) | | |
| | Matrix (A4) | | |
| | SAN | PC OD | PA6 |
| Mean wave depth MW Wt (μm) | 5.2 | 11.7 | 12.3 |
| Maximum wave depth Max Wt (μm) | 7.8 | 22.3 | 17.2 |

The components here are defined as follows:
SAN: SAN-MA terpolymer, composition by weight (% by weight): 73/25/2, Mw: 250 000 g/mol (measured via gel permeation chromatography on standard columns with monodisperse polystyrene standards), MVR: 15-25 cm$^3$/10 min at 220° C./10 kg (ISO1133), viscosity number (in DMF) J=61-67 ml/g
PC OD: free-flowing amorphous polycarbonate (optical grade for optical disks)
PA6: semicrystalline free-flowing nylon-6
Fibers (B3): glass fiber weave, 2/2 twill (GF-KG) with basis weight=300 g/m$^2$, warp+weft=320 tex As apparent from table 6, the use of SAN-MA terpolymer is particularly advantageous with regard to the obtaining of a low wave depth on the surface. PC OD is found to be sensitive to stress-cracking.

Examples of Multilayer Organosheets

The fiber composite materials (organosheets) described, especially with an amorphous thermoplastic matrix, are particularly suitable for the production of transparent and translucent molded articles, films and coatings. Some examples are adduced hereinafter. Unless stated otherwise, the moldings are produced by injection molding.

Example 1: Production of the Fiber Composite Material M

40% by weight, based on the fiber composite material, of an acrylonitrile-styrene-maleic anhydride copolymer as thermoplastic molding compound A (produced from: 75% by weight of styrene, 24% by weight of acrylonitrile and 1% by weight of maleic anhydride) is compounded with 60% by weight, based on the fiber composite material, of a glass-based reinforcing fiber with chemically reactive functionality (silane groups) at the surface [GW 123-580K2 from P-D Glasseiden GmbH].

Example 2: Production of the Fiber Composite Material N

65% by weight, based on the fiber composite material, of an acrylonitrile-butadiene-styrene copolymer as thermoplastic molding compound A (ABS produced from: 45% by weight of butadiene, 30% by weight of styrene, 24% by weight of acrylonitrile and 1% by weight of maleic anhydride) is compounded with 35% by weight, based on the fiber composite material, of a glass-based reinforcing fiber with chemically reactive functionality (silane groups) at the surface [GW 123-580K2 from P-D Glasseiden GmbH]. The fiber composite material is subsequently provided with a ribbed structure.

Example 3: Production of Moldings from the Fiber Composite Materials M and N

Example A: Washing Machine Windows

Example B: Lens Covers

An elevated stiffness of the window and the lens cover is observed compared to corresponding materials consisting of glass. Moreover, the organosheets are less sensitive to scratches and pressure.

Further Flexural Stress Experiments on Fiber Composite Materials Reinforced with Sheetlike Structures The components are as defined above. Flexural stress and flexural modulus were determined according to DIN 14125: 2011-05.

The combinations and parameter settings for the process described in claim 1 are listed in the following table:

TABLE 7

Compositions of comp. 1, comp. 2, comp. 10 and comp. 15 and of the inventive compositions V3 to V9 and V11 to V14.

| No. | A1 | A2 | A3 | A4 | B1 | B2 | T [° C.] | t [s] |
|---|---|---|---|---|---|---|---|---|
| Comp. 1 | X | | | | X | | 260 | 20-30 |
| Comp. 2 | X | | | | X | | 300 | 30-30 |
| V3 | | X | | | X | | 280 | 20-30 |
| V4 | | X | | | X | | 280 | 40 |
| V5 | | X | | | X | | 320 | 30-30 |
| V6 | | | X | | X | | 300 | 20-30 |
| V7 | | | X | | X | | 320 | 20-30 |
| V8 | | | | X | X | | 310 | 20-30 |
| V9 | | | | X | X | | 320 | 20-30 |
| Comp. 10 | X | | | | X | | 320 | 20-30 |
| V11 | | X | | | X | | 320 | 20-30 |
| V12 | | X | | | | X | 320 | 20-30 |
| V13 | | | X | | | X | 320 | 20-30 |
| V14 | | | | X | | X | 320 | 20-30 |
| Comp. 15 | X | | | | | X | 320 | 20-30 |

X: proportion by weight of component A:B = 60:40

Table 7 shows the conditions in the experiments conducted.

In this context, the reactants and the temperature and pressing time were varied. The pressure in all the test series was about 20 bar.

TABLE 8

Mean values for maximum flexural stress in warp and weft direction for the organosheets produced according to the mixtures comp. 2, V5, V7, V9, comp. 10, V12 to V14 and comp. 15, with a production temperature in each case of at least 300° C.

| No. | Fiber direction | Mean values for maximum flexural stress [MPa] |
|---|---|---|
| Comp. 2 | warp direction | 211.23 |
| | weft direction | 184.94 |
| V5 | warp direction | 670.48 |
| | weft direction | 271.05 |
| V7 | warp direction | 590.98 |
| | weft direction | 301.21 |
| V9 | warp direction | 371.73 |
| | weft direction | 244.62 |
| Comp. 10 | warp direction | 319.8 |
| | weft direction | 236.01 |
| V12 | warp direction | 556.15 |
| | weft direction | 484.24 |
| V13 | warp direction | 528.96 |
| | weft direction | 386.83 |
| V14 | warp direction | 513.95 |
| | weft direction | 413.86 |
| comp. 15 | warp direction | 423.03 |
| | weft direction | 301.40 |

The values shown in table 8 are the mean value of 9 measurements in each case. Table 8 shows that the inventive organosheets V5, V7, V9, V12, V13 and V14 have a higher mean maximum flexural stress than the organosheets having a matrix comprising 75% by weight of styrene (S) and 25% by weight of acrylonitrile (AN) (comp. 10 and comp. 15). The comparison of V9 with comp. 10 also shows that, under the same conditions (T=320° C. and t=30 s), the organosheet of the invention has greater flexural stress both in warp direction and in weft direction.

It is found that the process for producing the fiber composite material with a thermoplastic molding compound A and reinforcing fibers B can give improved products.

Further Examination of Multilayer Fiber Composite Materials

Technical Data of the Intermittent Hot Press (IVHP):

Quasi-continuous production of fiber-reinforced semifinished products, laminates and sandwich sheets Sheet width: 660 mm Laminate thickness: 0.2 to 9.0 mm Laminate tolerances: max.±0.1 mm corresponding to semifinished product Sandwich sheet thickness: max. 30 mm Output: about 0.1-60 m/h, depending on quality and component thickness Nominal advance rate 5 m/h Mold pressure: press unit 5-25 bar, infinitely adjustable for minimum and maximum mold size (optional)

Mold temperature control: 3 heating and 2 cooling zones

Mold temperature: up to 400° C.

Mold length: 1000 mm

Press opening distance: 0.5 to 200 mm

Production direction: from right to left

Technical Data of the Melt Plastification:

Discontinuous melt discharge in center position for production of fiber-reinforced thermoplastic semifinished products:

Screw diameter: 35 mm

Max. stroke volume: 192 cm$^3$

Max. screw speed: 350 rpm

Max. discharge flow rate: 108 cm$^3$/s

Max. discharge pressure: 2406 bar (specific)

Here:

Melt volume: 22 ccm isobaric=pressure-controlled pressing operation isochoric=volume-control pressing operation T [° C.]=temperature of the temperature zones* (*the press has 3 heating and 2 cooling zones, specified in production direction)

p [bar]=pressure per cycle: isochoric 20 s [mm]=distance limit for compression thickness: 1.1 mm

Temperature profile: (i) 210 to 245° C., so about 220° C.

(ii) 300 to 325° C., so about 300° C.

(iii) 270 to 320° C., so about 280 to 320° C.

(iv) 160 to 180° C.

(v) 80° C.

t [sec]=pressing time per cycle: 20-30 s

Construction/lamination: 6-ply construction with middle melt layer; production process: direct melt (SD)

Matrix Components A:

M1 (SAN type): styrene-acrylonitrile-maleic anhydride (SAN-MA) terpolymer (S/AN/MA: 74/25/1) with an MA content of 1% by weight and an MVR of 22 cm$^3$/10 min at 220° C./10 kg (measured to ISO1133);

M1b corresponds to the aforementioned component M1, with an additional 2% by weight of industrial black mixed into the matrix.

M2 (SAN type): styrene-acrylonitrile-maleic anhydride (SAN-MA) terpolymer (S/AN/MA: 73/25/2.1) with an MA content of 2.1% by weight and an MVR of 22 cm$^3$/10 min at 220° C./10 kg (measured to ISO1133);

M2b corresponds to the aforementioned component M2, with an additional 2% by weight of industrial black mixed into the matrix.

M3 (SAN type): blend of 33% by weight of M1 and 67% by weight of the SAN copolymer Luran VLN, so 0.33% by weight of maleic anhydride (MA) in the overall blend;

M3b corresponds to the aforementioned component M3, with an additional 2% by weight of industrial black mixed into the matrix.

PA6: semicrystalline, free-flowing polyamide Durethan B30S

PD(OD): free-flowing amorphous optical grade polycarbonate for optical discs;

Fiber Components B:

Glass filament twill weave (brief designations: GF-KG (LR) or LR), 2/2 twill weave, basis weight 290 g/m², EC9 68 tex rovings, TF-970 finish, supply width 1000 mm (type: 01102 0800-1240; manufacture: Hexcel, obtained from: Lange+Ritter)

Glass filament twill weave (brief designations: GF-KG (PD) or PD), 2/2 twill weave, basis weight 320 g/m², 320 tex rovings, 350 finish, supply width 635 mm (type: EC14-320-350, manufacturer and supplier: PD Glasseide GmbH Oschatz)

Glass filament scrim (brief designations: GF-GE(Sae) or Sae) 0°/45°/90°/−45°, basis weight 313 g/m², 300 tex main rovings, PA size finish, supply width 655 mm (type: X-E-PA-313-655, no. 7004344, manufacturer and supplier: Saertex GmbH & Co. KG)

Sae n.s.=300 g/m² glass filament scrim, manufacturer designation: Saertex new sizing, +45°/−45°/+45°/−45°

Glass fiber nonwoven (brief designation: GV50), basis weight 50 g/m², fiber diameter 10 μm, supply width 640 mm (type: Evalith S5030, manufacturer and supplier: Johns Manville Europe)

Visual Assessment

All the fiber composite materials produced were producible in each case as flat organosheets (with a large area) in a continuous process, and it was possible without any problem to cut these to size (in laminatable, customary transport dimensions, for instance 1 m×0.6 m). In the case of the transparent fiber composite materials, the embedded fiber material was just apparent on detailed backlit inspection. In the case of the fiber composite materials with a (black-)colored matrix, the embedded fiber material was not/barely apparent even on closer backlit visual inspection.

Microscope Assessment

In this case, defects (craters, dips, etc.) were assessed via epiluminescence microscopy, and the surface quality via confocal laser scanning microscopy (LSM). By means of LSM, a top view of a three-dimensional (3D) survey (7.2 mm×7.2 mm) of the local measurement region and a two-dimensional (2D) representation of the differences in height after scaling and use of various profile filters were created. Measurement errors and general distortion/skewness of the sample were compensated for by the use of profile filters (noise filters and tilt filters). The 2D high profile of the image was converted to line profiles via defined measurement lines by integrated software and evaluated with computer assistance.

Fiber composite materials each having four plies of the appropriate sheetlike structure of fibers (GF-KG(PD)(4) or Sae(4) here) embedded into the respective matrix were produced. In order to further increase the comparability of the samples, a thin glass fiber nonwoven (GV50, see above) was applied to each side of the fiber composite materials produced. This had no noticeable effect on the mechanical properties.

The mean wave depth (MW Wt) and the median roughness (Ra) were ascertained for numerous fiber composite materials. It was found that the MW Wt for all fiber composite materials in which the matrix comprises a functional component that can react with the fibers is distinctly <10 μm, whereas in the case of fiber composite materials with comparable PA6 and PD(OD) matrices it is distinctly <10 μm. The median roughness values ascertained were also much less for fiber composite materials of the invention. This is shown by way of example by the measured values below.

TABLE 9

Test results of the LSM analysis with SAN matrix system - wave depth (Wt) and median roughness (Ra)

|  | SAN(1) | | | | PC(1) | PA6(1) |
|---|---|---|---|---|---|---|
|  | Construction +GF-KG(PD)(4) Components | | | | | |
|  | M1b + PD | M2 + PD | M2b + PD | M3b + PD | PC(OD) + PD | PA6 + PD |
| MW Wt | 7.141 | 7.187 | 5.181 | 5.425 | 11.745 | 12.323 |
| MW Ra | 3.995 | 4.415 | 4.17 | 3.451 | 6.406 | 4.968 |

This likewise became clear when a scrim (such as Sae) was used in place of the weave:

TABLE 10

Test results of the LSM analysis with SAN matrix system - wave depth (Wt) and median roughness (Ra)

|  | Construction | | |
|---|---|---|---|
|  | SAN(1) | | PA6(1) |
|  | Construction +Sae(4) Components | | |
|  | M1b + Sae | M2b + Sae | |
| MW Wt | 5.535 | 5.205 | 17.05 |
| MW Ra | 4.261 | 4.24 | 4.861 |

In further tests, strength in warp direction and in weft direction was examined separately. It was shown that the fiber composite materials are very stable both in warp direction and in weft direction. The fiber composite materials are generally even more stable in warp direction than in weft direction.

It has been found to be particularly advantageous to use relatively high temperatures of >300° C., for instance 310° C. or 320° C., in the compounding of the fibers with the matrix. As a result it has been possible to achieve particularly good increases in flexural stress.

Mechanical Properties

Matrix Components A

The matrix components A are as described above.

Fiber Components B (if not Described Above)

FG290=glass filament weave 290 g/m², manufacturer designation: Hexcel HexForce® 01202 1000 TF970

FG320=glass filament weave 320 g/m², manufacturer designation: PD Glasseide GmbH Oschatz EC14-320-350

Sae=MuAx313, glass filament scrim 300 g/m², manufacturer designation: Saertex X-E-PA-313-655

Sae n.s.=glass filament scrim 300 g/m², manufacturer designation: Saertex new sizing, +45°/−45°/+45°/−45°

Number of layers (for example 4x=four layers of the respective fiber scrim or of the respective fibers)

The transparent fiber composite materials which follow were produced, into each of which was introduced flat fiber material. The fiber composite materials produced each had a thickness of about 1.1 mm. In order to further increase the comparability of the samples, a thin glass fiber nonwoven (GV50, see above) was applied to each side of the fiber composite materials produced. This has no noticeable effect on the mechanical or optical properties. For the samples, the following flexural strengths were ascertained according to DIN EN ISO 14125:

TABLE 11

Transparent fiber composite materials - flexural strength

| No. | Con-struction | Glass content [g/m²] | Matrix | Thickness [mm] | Modulus of elasticity | Flexural strength |
|---|---|---|---|---|---|---|
| F/T_1 | 4xFG290 | 1260 | M2 | 1.09 | 18.41 | 658.89 |
| F/T_2 | 4xFG320 | 1380 | M2 | 1.09 | 18.17 | 634.32 |
| F/T_3 | 4xSae | 1352 | M2 | 1.16 | 18.44 | 444.33 |
| F/T_4 | Sae n.s. |  | M2 | 1.17 | 15.93 | 621.04 |
| F/T_5 | 4xFG320 | 1380 | PC(OD) | 1.14 | 23.36 | 377.97 |

Additionally produced were the black-colored fiber composite materials which follow, in which 2% by weight of industrial black was mixed into the matrix and into each of which flat fiber material was introduced. The fiber composite materials produced each had a thickness of about 1.1 mm. In order to further increase the comparability of the samples, a thin glass fiber nonwoven (GV50, see above) was applied to each side of the fiber composite materials produced. This has no noticeable effect on the mechanical or optical properties. For the samples, the following flexural strengths were ascertained according to DIN EN ISO 14125:

TABLE 12

Nontransparent fiber composite materials - flexural strength

| No. | Con-struction | Glass content [g/m²] | Matrix | Thickness [mm] | Modulus of elasticity | Flexural strength |
|---|---|---|---|---|---|---|
| F/S_1 | 4xFG290 | 1260 | M2 | 1.07 | 21.61 | 661.73 |
| F/S_2 | 4xFG320 | 1380 | M2 | 1.20 | 22.70 | 673.99 |
| F/S_3 | 4xSae | 1352 | M2 | 1.15 | 14.92 | 385.21 |
| F/S_4 | 4xSae | 1352 | PA6 | 1.13 | 14.30 | 477.77 |
| F/S_5 | 4xFG320 | 1380 | PA6 | 1.11 | 16.95 | 471.97 |

In summary, it is found that the weaves used (FG290 and FG320) can be processed to give fiber composite materials having particularly high flexural strength. The fiber composite materials of the invention in which the matrix comprises a component that reacts with the fibers (here: maleic anhydride (MA)) have a significantly higher flexural strength than comparative molding compounds without any such component, for instance PC(OD) or PA6.

By comparison, for the noninventive Luran 378P G7 fiber composite material reinforced with short glass fibers, only a flexural strength of 150 MPa was found, and so a much lower flexural strength.

In addition, for the fiber composite materials, the impact resistance or penetration characteristics (dart test according to ISO 6603) were ascertained. Here too, the fiber composite materials showed a high stability of Fm >3000 N.

Optional Further Processing

It was also shown experimentally that the fiber composite materials obtained had good formability to give three-dimensional semifinished products, for example to give semifinished products in half-shell form. It was additionally shown that the fiber composite materials obtained were printable and laminatable.

Summary of the Experimental Results

The evaluation of different glass fiber-based textile systems with different matrix systems to give a fiber composite material (organosheet) showed that good fiber composite materials (as organosheets and semifinished products produced therefrom) can be produced in a reproducible manner. These can be produced in colorless or colored form.

The fiber composite materials showed good to very good optical, tactile and mechanical properties (for instance with regard to their flexural strength and puncture resistance). In mechanical terms, the weaves showed somewhat greater strength and stiffness than scrims. The styrene copolymer-based matrices (SAN matrices) tended to lead to better fiber composite materials in terms of the mechanical indices than the alternative matrices such as PC and PA6. The fiber composite materials of the invention were producible in a semiautomatic or fully automatic manner by means of a continuous process. The fiber composite materials (organosheets) of the invention have good formability to give three-dimensional semifinished products.

The invention claimed is:

1. A process for producing a thermoplastic fiber composite material from a thermoplastic matrix M comprising at least one thermoplastic molding compound A and reinforcing fibers B, comprising the steps of:
    i) providing at least one sheetlike structure F composed of reinforcing fibers B,
    ii) introducing the at least one sheetlike structure F into a thermoplastic matrix M,
    iii) reacting functional groups in the thermoplastic matrix M with polar groups on the surface of the reinforcing fibers B,
    iv) consolidating the fiber composite material, and
    v) optionally cooling and further process steps,
    wherein the sheetlike structure F is selected from the group consisting of weaves, mats, nonwovens, scrims, and knits,
    wherein the sheetlike structure F permeates more than 50% of the area of the fiber composite material in two of the three spatial directions, and
    wherein step (iii) is conducted at a temperature of at least 200° C. wherein the residence time at temperatures of at least 200° C. is not more than 10 minutes.

2. The process for producing a thermoplastic fiber composite material as claimed in claim 1, wherein the fiber composite material comprises
    a) at least one thermoplastic molding compound as matrix M,
    b) at least one sheetlike structure F composed of reinforcing fibers B, and
    c) optionally at least one additive C,
    in which multiple sheetlike structures F composed of reinforcing fibers B have been embedded into the matrix M and the thermoplastic molding compound A has at least one chemically reactive functionality.

3. The process for producing a thermoplastic fiber composite material as claimed in claim 1, wherein the fiber composite material consists of:
   a) 30% to 95% by weight of the thermoplastic matrix M,
   b) 5% to 70% by weight of the reinforcing fibers B, and
   c) 0% to 40% by weight of the additive C.

4. The process for producing a thermoplastic fiber composite material as claimed in claim 1, wherein the thermoplastic molding compound A used as matrix M is amorphous.

5. The process for producing a thermoplastic fiber composite material as claimed in claim 1, wherein the thermoplastic molding compound A is selected from the group consisting of polystyrene (glass-clear or impact-resistant), styrene-acrylonitrile copolymers, alpha-methylstyrene-acrylonitrile copolymers, impact modified acrylonitrile-styrene copolymers, styrene-methyl methacrylate copolymers, and acrylonitrile-styrene-acrylic ester copolymers, and blends of the copolymers mentioned with polycarbonate or polyamide.

6. The process for producing a thermoplastic fiber composite material as claimed in claim 1, wherein the chemically reactive functionality of the thermoplastic molding compound A is based on components selected from the group consisting of maleic anhydride function, N-phenylmaleimide function, and glycidyl (meth)acrylate function.

7. The process for producing a thermoplastic fiber composite material as claimed in claim 1, wherein the thermoplastic molding compound A is produced using at least 0.1% by weight of monomers, based on component A, having a chemically reactive functionality.

8. The process for producing a thermoplastic fiber composite material as claimed in claim 1, wherein the surface of the reinforcing fibers B comprises one or more of the functions from the group of hydroxyl, ester, and amino groups.

9. The process for producing a thermoplastic fiber composite material as claimed in claim 1, wherein component A is produced from 65% to 80% by weight of (a-methyl)styrene, 19.9% to 32% by weight of acrylonitrile, and 0.1% to 3% by weight of maleic anhydride, and wherein the sheetlike structure F is a scrim, a weave, a mat, a nonwoven, or a knit.

10. The process for producing a thermoplastic fiber composite material as claimed in claim 1, wherein the reinforcing fibers B consist of glass fibers comprising silanol groups on the surface as chemically reactive functionality.

11. The process for producing a thermoplastic fiber composite material as claimed in claim 1, wherein the fiber composite material has a ribbed structure or a sandwich structure and a layered construction.

12. The process for producing a thermoplastic fiber composite material as claimed in claim 1, wherein the temperature for production of the fiber composite material is at least 200° C.

13. The process for producing a thermoplastic fiber composite material as claimed in claim 1, wherein component A is produced from
   65% to 80% by weight of ($\alpha$-methyl)styrene,
   19.9% to 32% by weight of acrylonitrile, and
   0.1% to 3% by weight of maleic anhydride,
   wherein the sheetlike structure F is a scrim, a weave, a mat, a nonwoven, or a knit, and
   wherein the residence time for production of the fiber composite material at temperatures of at least 200° C. is not more than 10 minutes.

14. The fiber composite material produced according to claim 1.

15. The process for producing a thermoplastic fiber composite material as claimed in claim 1, wherein the temperature for production of the fiber composite material is at least 250° C.

16. The process for producing a thermoplastic fiber composite material as claimed in claim 1, wherein the temperature for production of the fiber composite material is at least 300° C.

17. The process for producing a thermoplastic fiber composite material as claimed in claim 1, wherein the residence time for production of the fiber composite material at temperatures of at least 200° C. is not more than 5 minutes.

18. The process for producing a thermoplastic fiber composite material as claimed in claim 1, wherein the residence time for production of the fiber composite material at temperatures of at least 200° C. is not more than 2 minutes.

19. A molded body, a film, or a coating comprising the fiber composite material produced according to claim 1.

* * * * *